US012725006B2

(12) United States Patent
Vichare et al.

(10) Patent No.: US 12,725,006 B2
(45) Date of Patent: Sep. 1, 2026

(54) ARTIFICIAL INTELLIGENCE (AI) MODEL CHARACTERIZATION AND OFFLOADING IN A HETEROGENEOUS COMPUTING PLATFORM

(71) Applicant: Dell Products, L.P., Round Rock, TX (US)

(72) Inventors: Nikhil Manohar Vichare, Austin, TX (US); Daniel L. Hamlin, Round Rock, TX (US); Srikanth Kondapi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 809 days.

(21) Appl. No.: 17/936,868

(22) Filed: Sep. 30, 2022

(65) Prior Publication Data

US 2024/0111992 A1 Apr. 4, 2024

(51) Int. Cl.

*G06F 16/00* (2019.01)
*G06F 11/34* (2006.01)
*G06N 3/044* (2023.01)
*G06N 3/08* (2023.01)

(52) U.S. Cl.

CPC ......... *G06N 3/044* (2023.01); *G06F 11/3409* (2013.01); *G06N 3/08* (2013.01)

(58) Field of Classification Search

None

See application file for complete search history.

(56) References Cited

U.S. PATENT DOCUMENTS 10,839,168 B2 * 11/2020 Rofrano .................. G06N 5/04
10,909,180 B2 * 2/2021 Freed ...................... G06F 16/93
10,936,529 B2 * 3/2021 Iyer ...................... G06F 9/45558
11,182,416 B2 * 11/2021 Margulis ............. G06F 16/3347
11,189,269 B2 * 11/2021 Tan ........................ G10L 15/22
11,409,965 B2 * 8/2022 Agarwal ............... G06F 40/289
11,676,049 B2 * 6/2023 Chen .................... G06N 3/0499 706/12
12,419,509 B1 * 9/2025 Gonsowski .......... A61B 5/7246
2015/0331473 A1 * 11/2015 Jreji ...................... G06F 1/3268 713/320
2018/0307545 A1 * 10/2018 Ganesan ................. G06F 9/542
2019/0034635 A1 * 1/2019 Khatri ..................... G06F 21/57
2020/0133752 A1 * 4/2020 Ganesan .................. G06F 1/28

(Continued)

*Primary Examiner* — Jean M Corrielus
(74) *Attorney, Agent, or Firm* — Fogarty LLP

(57) ABSTRACT

Systems and methods for Artificial Intelligence (AI) model characterization and offloading in a heterogenous computing platform are described. In an embodiment, an Information Handling System (IHS) may include: a heterogeneous computing platform including a plurality of devices and a memory, where the memory includes a plurality of sets of firmware instructions, where each of the sets of firmware instructions, upon execution by a respective device, enables it to provide a corresponding service, and where at least one of the devices operates as an orchestrator configured to: receive a characterization result from a first device, where the first device is configured to execute a first AI model configured to characterize a second AI model executed by a second device, and, prior to a subsequent execution of the second AI model, assign the second AI model to a third device based, at least in part, upon the characterization result.

19 Claims, 12 Drawing Sheets

(56) References Cited

U.S. PATENT DOCUMENTS

| | | | | |
|---|---|---|---|---|
| 2020/0134025 | A1* | 4/2020 | Margulis | G06F 40/247 |
| 2020/0226180 | A1* | 7/2020 | Freed | G06F 16/90348 |
| 2020/0226213 | A1* | 7/2020 | Freed | G06F 16/90332 |
| 2020/0227030 | A1* | 7/2020 | Tan | G10L 15/063 |
| 2020/0265118 | A1* | 8/2020 | Rofrano | G06F 40/40 |
| 2020/0380336 | A1* | 12/2020 | Chowdhury | G06N 3/044 |
| 2020/0409901 | A1* | 12/2020 | Iyer | G06F 15/7867 |
| 2021/0081756 | A1* | 3/2021 | Zamora Esquivel | G06N 3/084 |
| 2021/0081817 | A1* | 3/2021 | Chen | G06N 3/0499 |
| 2021/0147182 | A1* | 5/2021 | Cheung | G06N 3/09 |
| 2021/0150037 | A1* | 5/2021 | Radhakrishnan | G06F 21/10 |
| 2021/0156691 | A1* | 5/2021 | Kozhaya | G06N 20/00 |
| 2021/0191759 | A1* | 6/2021 | Fong | G06F 9/4881 |
| 2021/0342132 | A1* | 11/2021 | Parthasarathy | G06F 8/443 |
| 2021/0383205 | A1* | 12/2021 | Shang | G06F 40/20 |
| 2022/0114473 | A1* | 4/2022 | Awasthy | G06N 3/045 |
| 2022/0269858 | A1* | 8/2022 | Sen | G06N 3/04 |
| 2023/0121562 | A1* | 4/2023 | Maddukuri | G06F 9/50<br>718/104 |
| 2023/0123999 | A1* | 4/2023 | Ballard | G06F 13/4027<br>713/1 |
| 2023/0126350 | A1* | 4/2023 | Carkin | G06F 9/4411<br>713/2 |
| 2024/0111992 | A1* | 4/2024 | Vichare | G06N 3/045 |

* cited by examiner

600

ARTIFICIAL INTELLIGENCE (AI) MODEL CHARACTERIZATION AND OFFLOADING IN A HETEROGENEOUS COMPUTING PLATFORM

FIELD

This disclosure relates generally to Information Handling Systems (IHSs), and more specifically, to systems and methods for Artificial Intelligence (AI) model characterization and offloading in a heterogenous computing platform.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, IHSs with desktop and laptop form factors have had full-fledged Operating Systems (OSs) (e.g., WINDOWS, LINUX, MAC OS, etc.) executed on "x86" processors. Other types of processors, such as ARM processors, have been associated with smartphones and tablet devices, which typically carry thinner, simpler, or mobile OSs (e.g., ANDROID, iOS, WINDOWS MOBILE, etc.). In recent years, however, IHS manufacturers have started releasing desktop and laptop IHSs equipped with ARM processors, and newer OSs (e.g., WINDOWS on ARM) can now provide users with a more quintessential OS experience on those IHSs.

The inventors hereof have recognized that the IHS industry's transition from x86 to ARM-based processors has created new management, customization, optimization, interaction, servicing, and configuration opportunities for IHS users, Information Technology Decision Makers (ITDMs), and Original Equipment Manufacturers (OEMs).

SUMMARY

Systems and methods for Artificial Intelligence (AI) model characterization and migration in a heterogenous computing platform are described. In an illustrative, non-limiting embodiment, an Information Handling System (IHS) may include a heterogeneous computing platform including a plurality of devices and a memory coupled to the heterogeneous computing platform, where the memory comprises a plurality of sets of firmware instructions, where each of the sets of firmware instructions, upon execution by a respective device among the plurality of devices, enables the respective device to provide a corresponding firmware service, and where at least one of the plurality of devices operates as an orchestrator configured to: receive a characterization result from a first device among the plurality of devices, wherein the first device is configured to execute a first AI model, and wherein the first AI model is configured to characterize a second AI model executed by a second device among the plurality of devices; and prior to a subsequent execution of the second AI model, assign the second AI model to a third device among the plurality of devices based, at least in part, upon the characterization result.

In some implementations, the heterogeneous computing platform may include: a System-On-Chip (SoC), a Field-Programmable Gate Array (FPGA), or an Application-Specific Integrated Circuit (ASIC). The orchestrator may include at least one of: a sensing hub, an Embedded Controller (EC), or a Baseboard Management Controller (BMC).

In some cases, the characterization result may include a type of neural network or operation used in the second AI model. For example, the type of neural network may be selected from the group consisting of: a convolutional neural network, a recurrent neural network, and a long short-term memory neural network.

To receive the characterization result, the orchestrator may be configured to receive a message from a firmware service executed by the first device via an Application Programming Interface (API) without any involvement by any host Operating System (OS). For example, the first device may include the orchestrator and the second device may include a Central Processing Unit (CPU). Alternatively, the first and second devices may include a CPU.

In some cases, the first device may be configured to produce the characterization result, at least in part, based upon process or thread information associated with an application configured to consume an output of the second AI model. The process or thread information may be provided by a host Operating System (OS).

The third device may include a Graphical Processing Unit (GPU), an audio Digital Signal Processor (aDSP), a Video Processing Unit (VPU), an Image Signal Processor (ISP), a Neural Processing Unit (NPU), a Tensor Processing Unit (TSU), a Neural Network Processor (NNP), or an Intelligence Processing Unit (IPU).

To assign the second AI model to the third device, the orchestrator may be configured to send a message to a firmware service executed by the third device via an API without any involvement by any host OS. Additionally, or alternatively, to assign the second AI model to the third device, the orchestrator may be configured to select the third device based, at least in part, upon the characterization result. Additionally, or alternatively, to assign the second AI model to the third device, the orchestrator may be further configured to select the third device based, at least in part, upon contextual or telemetry data.

The context or telemetry data may include a metric indicative of at least one of: a core utilization, a memory utilization, a network utilization, a battery utilization, a peripheral device utilization, a user's presence, a user's engagement, an IHS location, an IHS posture, or an application in execution by the IHS.

The orchestrator may be further configured to receive a policy from an Information Technology Decision Maker (ITDM) or Original Equipment Manufacturer (OEM), and the policy may identify at least one of: the first device, the first AI model, the second device, or the second AI model.

Additionally, or alternatively, the policy may include one or more rules, and wherein each rule associates a different characterization result with one or more of the plurality of devices.

The orchestrator may be further configured to notify at least one of: a host OS executed by the heterogeneous computing platform, an application instantiated by the host OS, or a user of the IHS of the assignment.

In another illustrative, non-limiting embodiment, a memory may be coupled to a heterogeneous computing platform, where the heterogeneous computing platform includes a plurality of devices, where the memory is configured to receive a plurality of sets of firmware instructions, where each set of firmware instructions, upon execution by a respective device among the plurality of devices, enables the respective device to provide a corresponding firmware service without any involvement by any host OS, and where at least one of the plurality of devices operates as an orchestrator configured to: identify a type of an AI model executed by a device among the plurality of devices; and instruct another device among the plurality of devices to execute the AI model based, at least in part, upon the identification.

In another illustrative, non-limiting embodiment, a method may include: selecting a policy; and transmitting the policy to an IHS over a network, where the IHS comprises a heterogeneous computing platform having a plurality of devices, and where an orchestrator among the plurality of devices is configured to: infer a type of an AI model being executed by a device among the plurality of devices; select another device among the plurality of devices to execute the AI model based, at least in part, upon the inference as applied to an ITDM or OEM policy; and offload subsequent execution of the AI model to the other device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
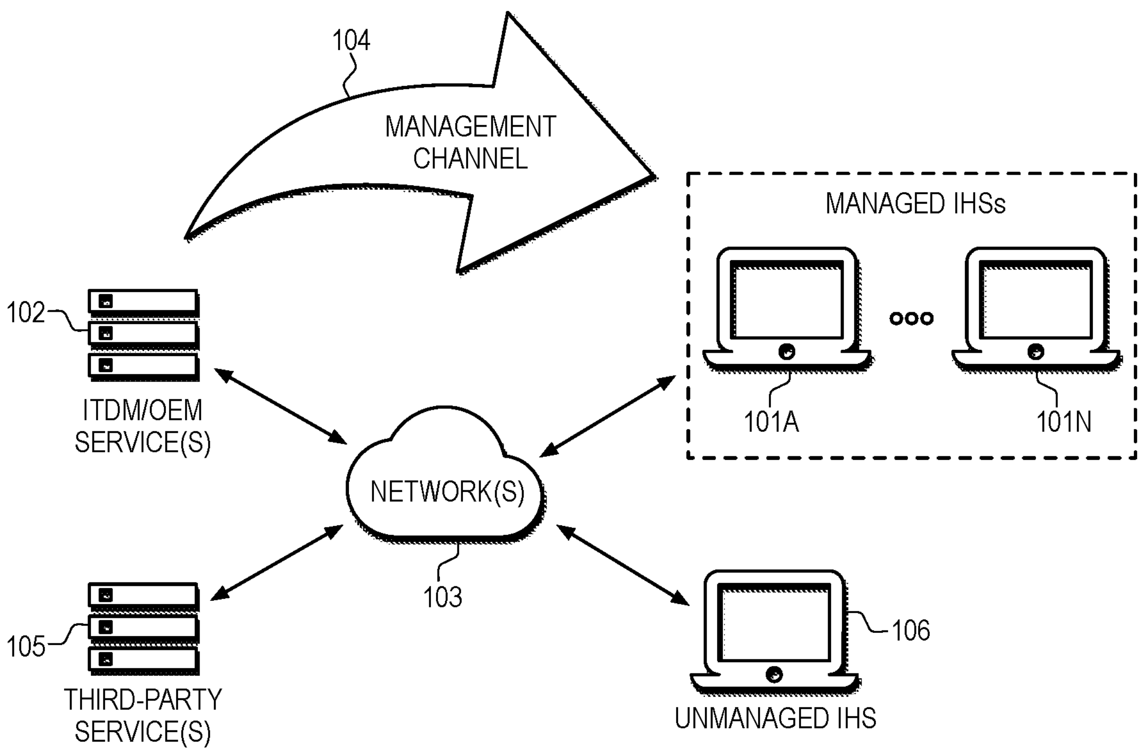
FIG. 1 is a diagram illustrating an example of an environment where systems and methods described herein may be implemented, according to some embodiments.
Figure 3:
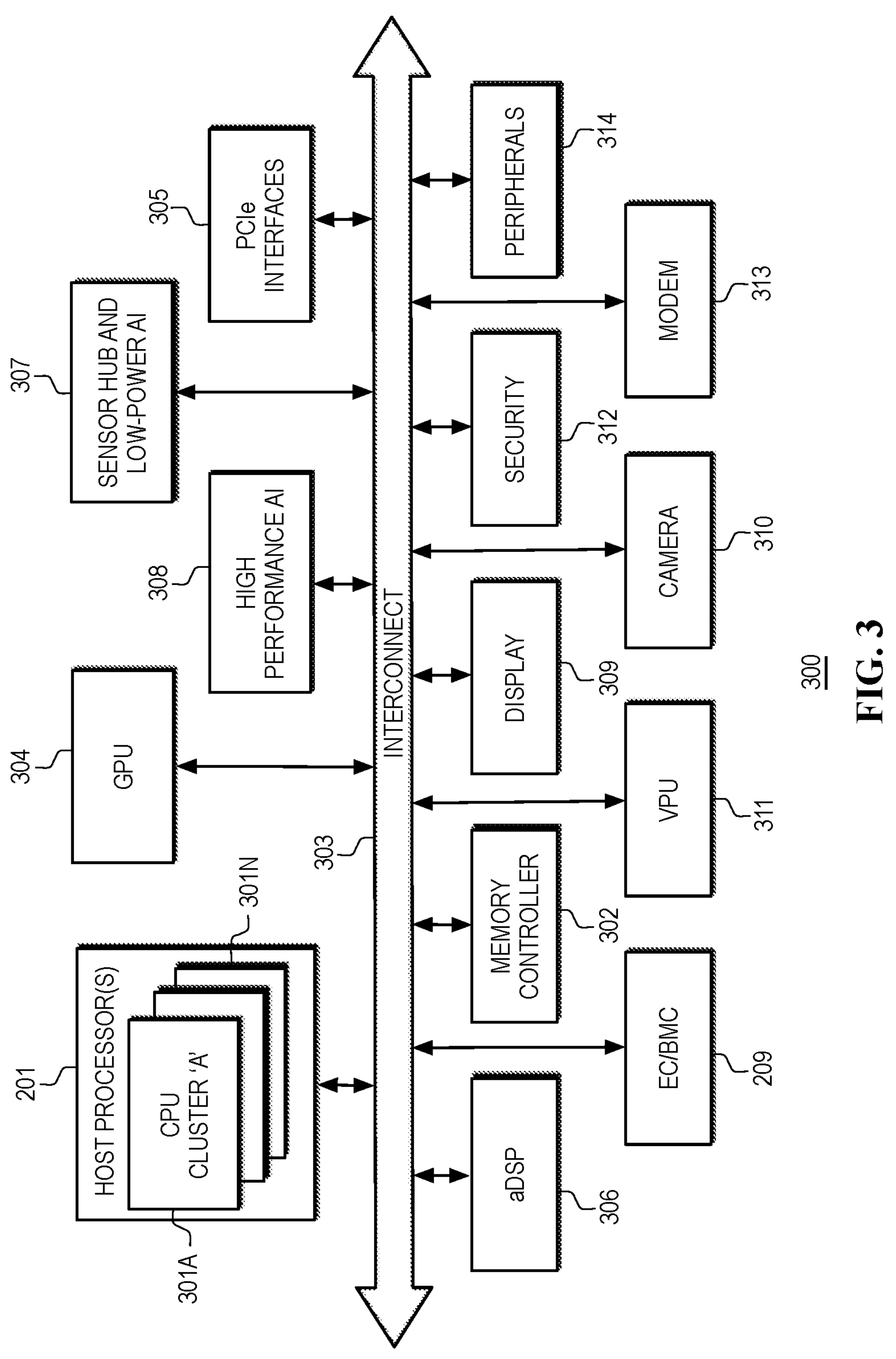
FIG. 3 is a diagram illustrating an example of a heterogenous computing platform, according to some embodiments.

FIG. 1 is a diagram illustrating an example of environment 100 where systems and methods described herein may be implemented. In various embodiments, managed IHSs 101A-N may be accessible to Information Technology (IT) Decision Maker (ITDM) or Original Equipment Manufacturer (OEM) service(s) 102 over network(s) 103 (e.g., the Internet, an intranet, etc.) via management channel 104. Moreover, one or more of managed IHSs 101A-N may be equipped with heterogenous computing platform 300 (FIG. 3).

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package. Each device in the platform has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc.

ITDM/OEM service(s) 102 may be provided on premises, along with one or more of managed IHSs 101A-N, or may be remotely located with respect to managed IHSs 101A-N. For example, one or more of managed IHSs 101A-N may be deployed within an enterprise, business, or corporation having an ITDM in charge of managing usage, operation, servicing, configuration, and other aspects of managed IHSs 101A-N.

Particularly, an ITDM may use one or more management tools executed by ITDM service(s) 102 to establish management channel 104 with managed IHSs 101A-N. Examples of management tools may include, but are not limited to, WINDOWS Admin Center, MICROSOFT Endpoint Configuration Manager, System Center Configuration Manager (SCCM), AZURE, INTUNE, VMWARE WORKSPACE ONE, etc.

ITDM/OEM service(s) 102 may be include an ITDM or OEM database. Such a database may include, for instance: an identification of managed IHSs 101A-N (e.g., by service tag, serial number, etc.), an inventory of IHS components installed in managed IHSs 101A-N (e.g., components integrated into managed IHSs 101A-N, peripheral devices coupled to managed IHSs 101A-N, etc.), an identification of a heterogenous computing platform 300 installed in managed IHSs 101A-N, a list of authorized users, usernames, passwords, logon credentials, cryptographic keys, digital certificates, Operating System (OS) installation or update packages, software application installation or update packages, firmware installation or update packages, hardware policies, software policies, telemetry collected from managed IHSs 101A-N, customer/client support information, etc.

In some cases, one or more management operations performed by ITDM/OEM service(s) 102 via management channel 104 may be selected or modified, at least in part, based upon information stored in the ITDM or OEM database. For example, a different firmware installation package containing a base driver and/or one or more extension drivers (sometimes referred to as information or "INF" drivers) may be selected, assembled, and/or delivered to each given one of managed IHSs 101A-N, specifically for the IHSs' heterogenous computing platform.

The term "firmware," as used herein, refers to a class of program instructions that provides low-level control for a device's hardware. Generally, firmware enables basic functions of a device and/or provides hardware abstraction services to higher-level software, such as an OS. The term "firmware installation package," as used herein, refers to program instructions that, upon execution, deploy device drivers or services in an IHS or IHS component.

The term "device driver" or "driver," as used herein, refers to program instructions that operate or control a particular type of device. A driver provides a software interface to hardware devices, enabling an OS and other applications to access hardware functions without needing to know precise details about the hardware being used. When an application invokes a routine in a driver, the driver issues commands to a corresponding device. Once the device sends data back to the driver, the driver may invoke certain routines in the application. Generally, device drivers are hardware dependent and OS-specific.

Still referring to environment 100, any of managed IHSs 101A-N may be in communication (e.g., during video and/or audio communications, collaboration sessions, etc.) with any other one of managed IHSs 101A-N and/or with another, third-party IHS 106, which is not necessarily managed by ITDM/OEM service(s) 102, over network(s) 103. Additionally, or alternatively, any of managed IHSs 101A-N may be in communication with third-party service(s) 105 (e.g., a cloud or remote service).

Examples of third-party service(s) 105 may include, but are not limited to, collaboration services (e.g., ZOOM, TEAMS, etc.), productivity services (e.g., MICROSOFT EXCHANGE servers, OFFICE 360, etc.), Artificial Intelligence (AI) services (e.g., AI as a Service or "AIaaS"), etc. In the case of AIaaS, orchestrator 501A (FIG. 6) of heterogenous computing platform 300 (FIG. 3) within managed IHSs 101A-N may assign or offload the execution of one or more AI models, at least in part, to third-party service(s) 105 (e.g., to debug an AI model when a failure occurs, to evaluate model parameters using more powerful servers, etc.).

As used herein, the terms "Artificial Intelligence" (AI) and "Machine Learning" (ML) are used interchangeably to refer to systems, computers, or machines that mimic human intelligence to perform tasks (and to iteratively improve themselves) based on the information they collect. Generally, AI is implemented through the execution, deployment, or serving of "AI models."

The term "AI model," as used herein, generally refers to a computer-executed algorithm that emulates logical decision-making based on data. For example, in various embodiments, AI model(s) may implement: a neural network (e.g., artificial neural network, deep neural network, convolutional neural network, recurrent neural network, autoencoders, reinforcement learning, etc.), fuzzy logic, deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of available software and libraries which may be utilized within embodiments of systems and methods described herein to perform AI modeling operations include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.Ish, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN.

Generally, an AI model may be executed or deployed as a service. In some cases, a container system (e.g., DOCKER, KUBERNETES, etc.) may operate as a "box" for an AI model that creates reproducible, scalable, and isolated environments where users can set up dependencies so the AI model can work in any desired execution environment, such as, for example, a selected one of the plurality of devices in heterogenous computing platform 300 (FIG. 3), host OS 400 (FIG. 4), and/or third-party service(s) 105.

Figure 2:
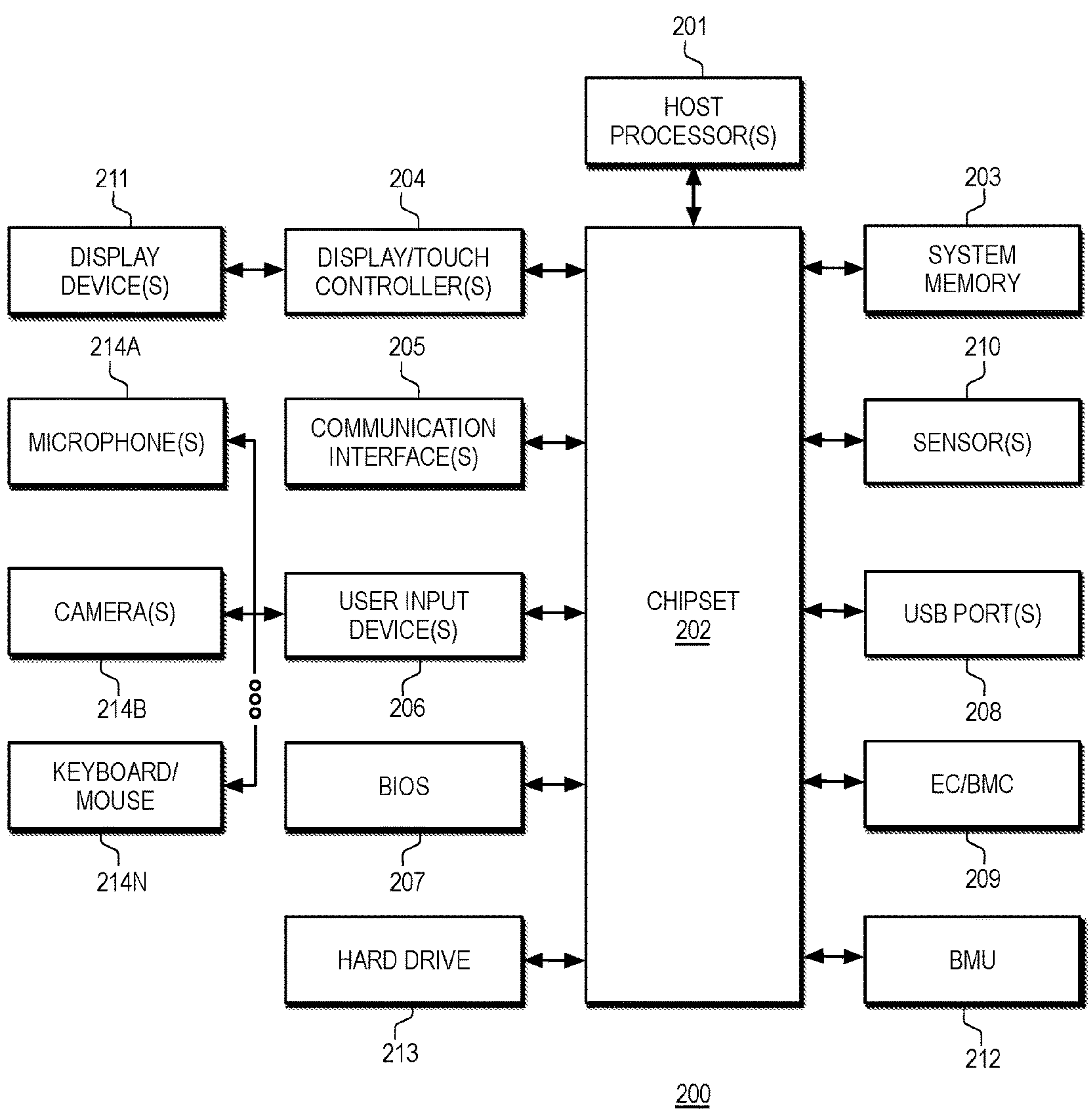
FIG. 2 is a diagram illustrating examples of components of an Information Handling System (IHS), according to some embodiments.

FIG. 2 is a block diagram of components of IHS 200, which may be used to implement any of managed IHSs 101A-N, unmanaged IHS 106, ITDM/OEM service(s) 102, and/or third-party service(s) 105 (FIG. 1). As depicted, IHS 200 includes host processor(s) 201. In various embodiments, IHS 200 may be a single-processor system, or a multi-processor system including two or more processors. Host processor(s) 201 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201.

Chipset 202 may also be coupled to communication interface(s) 205 to enable communications between IHS 200 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like. Communication interface(s) 205 may also be used to communicate with certain peripherals devices (e.g., BT speakers, microphones, headsets, etc.). Moreover, communication interface(s) 205 may be coupled to chipset 202 via a Peripheral Component Interconnect Express (PCIe) bus, or the like.

Chipset 202 may be coupled to display/touch controller(s) 204, which may include one or more or Graphics Processor Units (GPUs) on a graphics bus, such as an Accelerated Graphics Port (AGP) or PCIe bus. As shown, display/touch controller(s) 204 provide video or display signals to one or more display device(s) 211.

Display device(s) 211 may include Liquid Crystal Display (LCD), Light Emitting Diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, or as two or more discrete displays.

Chipset 202 may provide host processor(s) 201 and/or display/touch controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 202 may also provide host processor(s) 201 with access to one or more Universal Serial Bus (USB) ports 208, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 213.

Chipset 202 may also provide access to one or more user input devices 206, for example, using a super I/O controller or the like. Examples of user input devices 206 include, but are not limited to, microphone(s) 214A, camera(s) 214B, and keyboard/mouse 214N. Other user input devices 206 may include a touchpad, stylus or active pen, totem, etc. Each of user input devices 206 may include a respective controller (e.g., a touchpad may have its own touchpad controller) that interfaces with chipset 202 through a wired or wireless connection (e.g., via communication interfaces(s) 205). In some cases, chipset 202 may also provide access to one or more user output devices (e.g., video projectors, paper printers, 3D printers, loudspeakers, audio headsets, Virtual/Augmented Reality (VR/AR) devices, etc.)

In certain embodiments, chipset 202 may further provide an interface for communications with hardware sensors 210. Sensors 210 may be disposed on or within the chassis of IHS 200, or otherwise coupled to IHS 200, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 200, host processor(s) 201 may utilize program instructions of Basic Input/Output System (BIOS) 207 to initialize and test hardware components coupled to IHS 200 and to load an OS for use by IHS 200. BIOS 207 provides an abstraction layer that allows host OS 400 (FIG. 4) to interface with certain IHS components 200. Relying upon the hardware abstraction layer provided by BIOS 207, software stored in system memory 203 and executed by host processor(s) 201 can interface with certain I/O devices that are coupled to IHS 200.

The Unified Extensible Firmware Interface (UEFI) was designed as a successor to BIOS. As a result, many modern IHSs utilize UEFI in addition to or instead of a BIOS. As used herein, BIOS 207 is intended to also encompass a UEFI component.

Embedded Controller (EC) or Baseboard Management Controller (BMC) 209 is operational from the very start of each IHS power reset and handles various tasks not ordinarily handled by host processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing the battery charger and the battery, allowing remote diagnostics and remediation over network(s) 103, etc.

For example, EC/BMC 209 may implement operations for interfacing with a power adapter in managing power for IHS 200. Such operations may be performed to determine the power status of IHS 200, such as whether IHS 200 is operating from battery power or is plugged into an AC power source. Firmware instructions utilized by EC/BMC 209 may also be used to provide various core operations of IHS 200, such as power management and management of certain modes of IHS 200 (e.g., turbo modes, maximum operating clock frequencies of certain components, etc.).

In addition, EC/BMC 209 may implement operations for detecting certain changes to the physical configuration or posture of IHS 200. For instance, when IHS 200 as a 2-in-1 laptop/tablet form factor, EC/BMC 209 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some cases, EC/BMC 209 may be configured to identify any number of IHS postures, including, but not limited to: laptop, stand, tablet, or book. For example, when display(s) 211 of IHS 200 is open with respect to a horizontal keyboard portion, and the keyboard is facing up, EC/BMC 209 may determine IHS 200 to be in a laptop posture. When display(s) 211 of IHS 200 is open with respect to the horizontal keyboard portion, but the keyboard is facing down (e.g., its keys are against the top surface of a table), EC/BMC 209 may determine IHS 200 to be in a stand posture. When the back of display(s) 211 is closed against the back of the keyboard portion, EC/BMC 209 may determine IHS 200 to be in a tablet posture. When IHS 200 has two display(s) 211 open side-by-side, EC/BMC 209 may determine IHS 200 to be in a book posture. In some implementations, EC/BMC 209 may also determine if display(s) 211 of IHS 200 are in a landscape or portrait orientation.

In some cases, EC/BMC 209 may be installed as a Trusted Execution Environment (TEE) component to the motherboard of IHS 200. Additionally, or alternatively, EC/BMC 209 may be further configured to calculate hashes or signatures that uniquely identify individual components of IHS 200. In such scenarios, EC/BMC 209 may calculate a hash value based on the configuration of a hardware and/or software component coupled to IHS 200. For instance, EC/BMC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC/BMC 209 may later recalculate the hash value for a component may compare it against the reference hash value to determine if any modifications have been made to the component, thus indicating that the component has been compromised. In this manner, EC/BMC 209 may validate the integrity of hardware and software components installed in IHS 200.

In various embodiments, IHS 200 may be coupled to an external power source through an AC adapter, power brick, or the like. The AC adapter may be removably coupled to a battery charge controller to provide IHS 200 with a source of DC power provided by battery cells of a battery system in the form of a battery pack (e.g., a lithium ion (Li-ion) or nickel metal hydride (NiMH) battery pack including one or more rechargeable batteries) and battery management unit (BMU) 212 that includes, for example, an analog front end (AFE), storage (e.g., non-volatile memory), and a microcontroller. In some cases, BMU 212 may be configured to collect and store information, and to provide that information to other IHS components, such as, for example devices within heterogeneous computing platform 300 (FIG. 3).

Examples of information collected and maintained by BMU 212 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU 212 events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In other embodiments, IHS 200 may not include all the components shown in FIG. 1. In other embodiments, IHS 200 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 201 and/or other components of IHS 200 (e.g., chipset 202, display/touch controller(s) 204, communication interface(s) 205, EC/BMC 209, etc.) may be replaced by discrete devices within heterogenous computing platform 300 (FIG. 3). As such, IHS 200 may assume different form factors including, but not limited to: servers, workstations, desktops, laptops, appliances, video game consoles, tablets, smartphones, etc.

FIG. 3 is a diagram illustrating an example of heterogenous computing platform 300. In various embodiments, platform 300 may be implemented in an SoC, FPGA, ASIC, or the like. Platform 300 includes a plurality of discrete or segregated devices, each device having a different set of processing capabilities suitable for handling a particular type of computational task. When each device in platform 300 executes only the types of computational tasks it was specifically designed to execute, the overall power consumption of platform 300 is reduced.

In various implementations, each device in platform 300 may include its own microcontroller(s) or core(s) (e.g., ARM core(s)) and corresponding firmware. In some cases, a device in platform 300 may also include its own hardware-embedded accelerator (e.g., a secondary or co-processing core coupled to a main core).

Each device in platform 300 may be accessible through a respective Application Programming Interface (API). Additionally, or alternatively, each device in platform 300 may execute its own OS. Additionally, or alternatively, one or more of these devices may be a virtual device.

In certain embodiments, at least one device in platform 300 may have updatable firmware which, upon installation, operates to change the performance, available features, settings, configuration options, API, drivers, and/or services provided by that device. For example, each update may be delivered to platform 300 as a system-wide firmware installation package having a plurality of firmware components, and each firmware component may be distributed to its respective device (or corresponding memory space).

In some implementations, the latest system-wide firmware installation package received by platform 300 may be installed at every boot of IHS 200.

In the example of FIG. 3, platform 300 includes CPU clusters 301A-N in an implementation of host processor(s) 201 intended to perform general-purpose computing operations. Each of CPU clusters 301A-N may include a plurality or processing cores and a cache memory. In operation, CPU clusters 301A-N may be made available and accessible to host OS 400, optimization/customization application(s) 412, OS agent(s) 413, and/or other application(s) 414 (FIG. 4) executed by IHS 200.

CPU clusters 301A-N are coupled to memory controller 302 via main bus or interconnect 303. Memory controller 302 is responsible for managing memory accesses for all of devices connected to interconnect 303, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to interconnect 303 can communicate with each other and with a host OS executed by CPU clusters 301A-N through interconnect 303.

GPU 304 is a device designed to produce graphical or visual content and to communicate that content to a monitor or display, where the content may be rendered.

PCIe interfaces 305 provide an entry point into any additional devices external to platform 300 that have a respective PCIe interface (e.g., graphics cards, USB controllers, etc.).

Audio Digital Signal Processor (aDSP) 306 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc.

In operation, input and/or output audio streams may pass through and be processed by aDSP 306, which can send the processed audio to other devices on interconnect 303 (e.g., CPU clusters 301A-N). aDSP 306 may also be configured to process one or more of platform 300's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.). To that end, aDSP 306 may be coupled to BMU 212.

Sensor hub and low-power AI device 307 is a very low power, always-on device designed to consolidate information received from other devices in platform 300, process any context and/or telemetry data streams, and provide that information to: (i) a host OS, (ii) other applications, and/or (ii) other devices in platform 300. For example, sensor hub and low-power AI device 307 may include general-purpose input/output (GPIOs) that provide Inter-Integrated Circuit ($I^2C$), Serial Peripheral Interface (SPI), and/or serial interfaces to receive data from sensors (e.g., sensors 210, camera 310, peripherals 314, etc.).

As used herein, the terms "context data" or "contextual data" refer broadly to any relevant, background information that can provide a broader understanding of an entity or event. Generally, context data may come from various sources, and it may be used to provide insights into an IHS's operation and/or of a user's behavior patterns, thereby improving their experience.

For instance, examples of context data accessible by orchestrator 501A (FIG. 6) may include, but are not limited to: a type of audio environment indicative of the types of sounds being produced near a user of IHS 200 (e.g., indoors, outdoors, home, office, restaurant, car, airport, airplane, etc.), gyroscope data (e.g., an indication of an angular velocity, for example, in mV/deg/s), accelerometer data (e.g., an indication of a linear acceleration, for example, in mV/g), a Global Positioning System (GPS) or wireless network location data, Red-Green-Blue (RGB) image or camera data, infrared (IR) image or camera data, eye-gaze direction data, audio data, IHS posture data, a time-of-day/week/month/year, calendar event data, a role of the user (e.g., as an employee in an enterprise, as a participant of a collaboration session, etc.), a language of the user, data related to software applications in execution by IHS 200 (e.g., number of windows open, number of minimized windows, identity or type of applications 412-414 in execution, number of applications 412-414 in execution, etc.), financial/economic data, news, weather, traffic, social media activity, purchasing data, shipping or delivery data, etc.

In some cases, context data may be used to identify presence hint(s) and/or user engagement cue(s). As used herein, the term "presence hints" refers to any information usable to characterize whether a user is present or absent before IHS 200 and/or a distance between the user of IHS 200. For example, presence hints may include (or be derived from) data received from presence or proximity sensors 210, camera 310, peripheral devices 314 (e.g., whether the user is typing at a keyboard or moving a mouse), etc.

The term "user engagement cue" refers to any user's action, such as utterances, movements, stances, gestures (e.g., fingers, hand, arm, head, body, etc.), or other behavior indicative of whether and/or to what degree a user is engaged with aspects of IHS 200 and/or applications 412-414. In various implementations, to identify a user engagement cue, one or more devices in heterogenous computing platform 300 may be configured to perform speech and/or gesture recognition operations based on audio and/or video data streams captured with microphone(s) 214A and/or camera(s) 214B. Moreover, to determine a level of engagement of a user, orchestrator 501A may keep track of one or more engagement cues and calculate an engagement score based upon the number, frequency of occurrence, and/or weight of the detected cue(s).

The term "telemetry data," as used herein, refers to information resulting from in situ collection of measurements or other data by devices 301-314, or any other IHS device or component, and its transmission (e.g., automatically) to a receiving entity, such as orchestrator 501A (FIG. 6), for example, for monitoring purposes. Typically, telemetry data may include, but is not limited to, measurements, metrics, and/or values which may be indicative of: core utilization, memory utilization, network quality and utilization, battery utilization, peripheral or I/O device utilization, etc.

For instance, telemetry data may include, but is not limited to, measurements, metrics, logs, or other information related to: current or average utilization of devices 301-314 or other IHS components, CPU/core loads, instant or average power consumption of devices 301-314 or other IHS components, instant or average memory usage by devices 301-314 or other IHS components, characteristics of a network or radio system (e.g., WiFi vs. 5G, bandwidth, latency, errors, etc.), keyboard, mice, trackpad, or trackball usage data, transaction times, latencies, response codes, errors, data collected from sensors 210, etc.

It should be noted that, in some implementations, there may be overlap between context data and telemetry data and/or sources. In other implementations, however, context data and telemetry data and/or sources may be distinct from each other.

Figure 6:
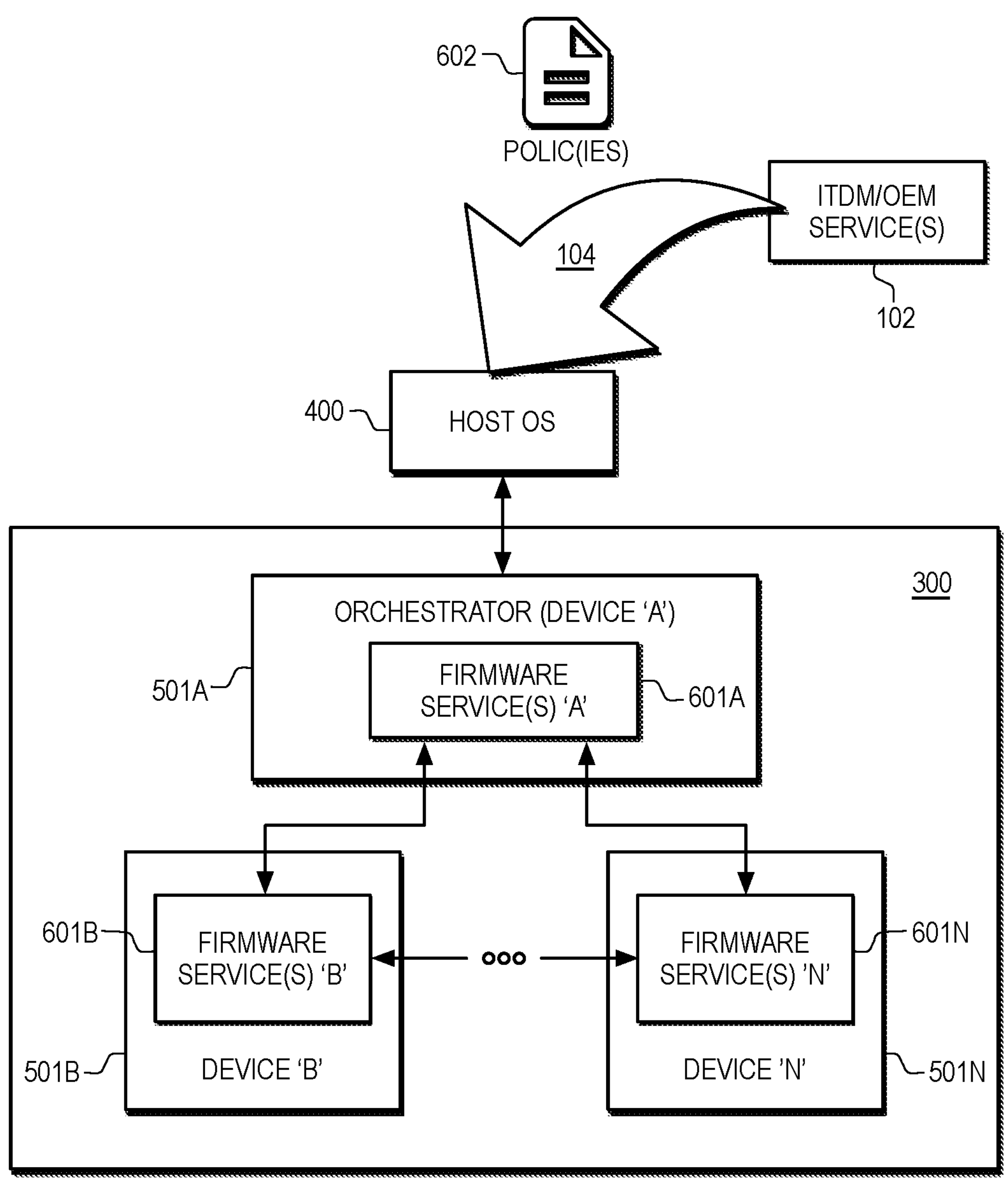
FIG. 6 is a diagram illustrating an example of an orchestration system where an orchestrator device is configured to manage other devices in a heterogenous computing platform, according to some embodiments.

Still referring to FIG. 3, sensor hub and low-power AI device 307 may include an always-on, low-power core configured to execute small neural networks and specific applications, such as contextual awareness and other enhancements. In some embodiments, sensor hub and low-power AI device 307 may be configured to operate as orchestrator 501A (FIG. 6).

High-performance AI device 308 is a significantly more powerful processing device than sensor hub and low-power AI device 307, and it may be designed to execute multiple complex AI algorithms and models concurrently (e.g., Natural Language Processing, speech recognition, speech-to-text transcription, video processing, gesture recognition, user engagement determinations, etc.).

For example, high-performance AI device 308 may include a Neural Processing Unit (NPU), Tensor Processing Unit (TSU), Neural Network Processor (NNP), or Intelligence Processing Unit (IPU), and it may be designed specifically for AI and Machine Learning (ML), which speeds up the processing of AI/ML tasks while also freeing processor 201 to perform other tasks.

Display/graphics device 309 may be designed specifically to perform video enhancement operations. In operation, display/graphics device 309 may provide a video signal to an external display coupled to IHS 200 (e.g., display device(s) 211).

Camera device 310 includes an Image Signal Processor (ISP) configured to receive and process video frames captured by a camera coupled to platform 300 (e.g., in the visible and/or infrared spectrum).

Video Processing Unit (VPU) 311 is a device designed to perform hardware video encoding and decoding operations, thus accelerating the operation of camera 310 and display/graphics device 309. For example, VPU 311 may be configured to provide optimized communications with camera device 310 for performance improvements.

In some cases, devices 309-311 may be coupled to interconnect 303 via a secondary interconnect. A secondary interconnect may include any bus suitable for inter-device and/or inter-bus communications within an SoC.

Security device 312 includes any suitable security device, such as a dedicated security processor, a Trusted Platform Module (TPM), a TRUSTZONE device, a PLUTON processor, or the like. In various implementations, security device 312 may be used to perform cryptography operations (e.g., generation of key pairs, validation of digital certificates, etc.) and/or it may serve as a hardware root-of-trust (RoT) for heterogenous computing platform 300 and/or IHS 200.

Modem and wireless controller 313 is a device designed to enable all wired and wireless communications in any suitable frequency band (e.g., Bluetooth, WiFi, 5G, etc.), subject to AI-powered optimizations/customizations for improved speeds, reliability, and/or coverage.

Peripherals 314 may include all other devices coupled to platform 300 (e.g., sensors 210) through mechanisms other than PCIe interfaces 305. In some cases, peripherals 314 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 200.

In some cases, devices 312-313 may be coupled to interconnect 303 via the same secondary interconnect serving devices 309-311. Additionally, or alternatively, devices 312-313 may be coupled to interconnect 303 via another secondary interconnect.

EC/BMC 209 is designed to enable management operations of IHS 200, similarly as described with respect to FIG. 2, but here integrated into platform 300, as yet another SoC device. Unlike other devices in platform 300, however, EC/BMC 209 may be operational from the very start of each SoC power reset, before other devices such as CPU clusters 301A-N or sensor hub and low-power AI device 307 are fully running or powered on.

EC/BMC 209 may also provide an out-of-band (00B) channel that serves as management channel 104 of FIG. 1. In some cases, EC/BMC 209 may be external to SoC platform 300 and coupled thereto via a high-speed interface (e.g., enhanced SPI or "eSPI"). In other cases, EC/BMC 209 may be configured to operate as orchestrator 501A (FIG. 6).

In various embodiments, one or more devices of heterogeneous computing platform 300 (e.g., GPU 304, aDSP 306, sensor hub and low-power AI device 307, high-performance AI device 308 VPU 311, etc.) may be configured to execute one or more AI model(s), simulation(s), and/or inference(s).

Figure 4:
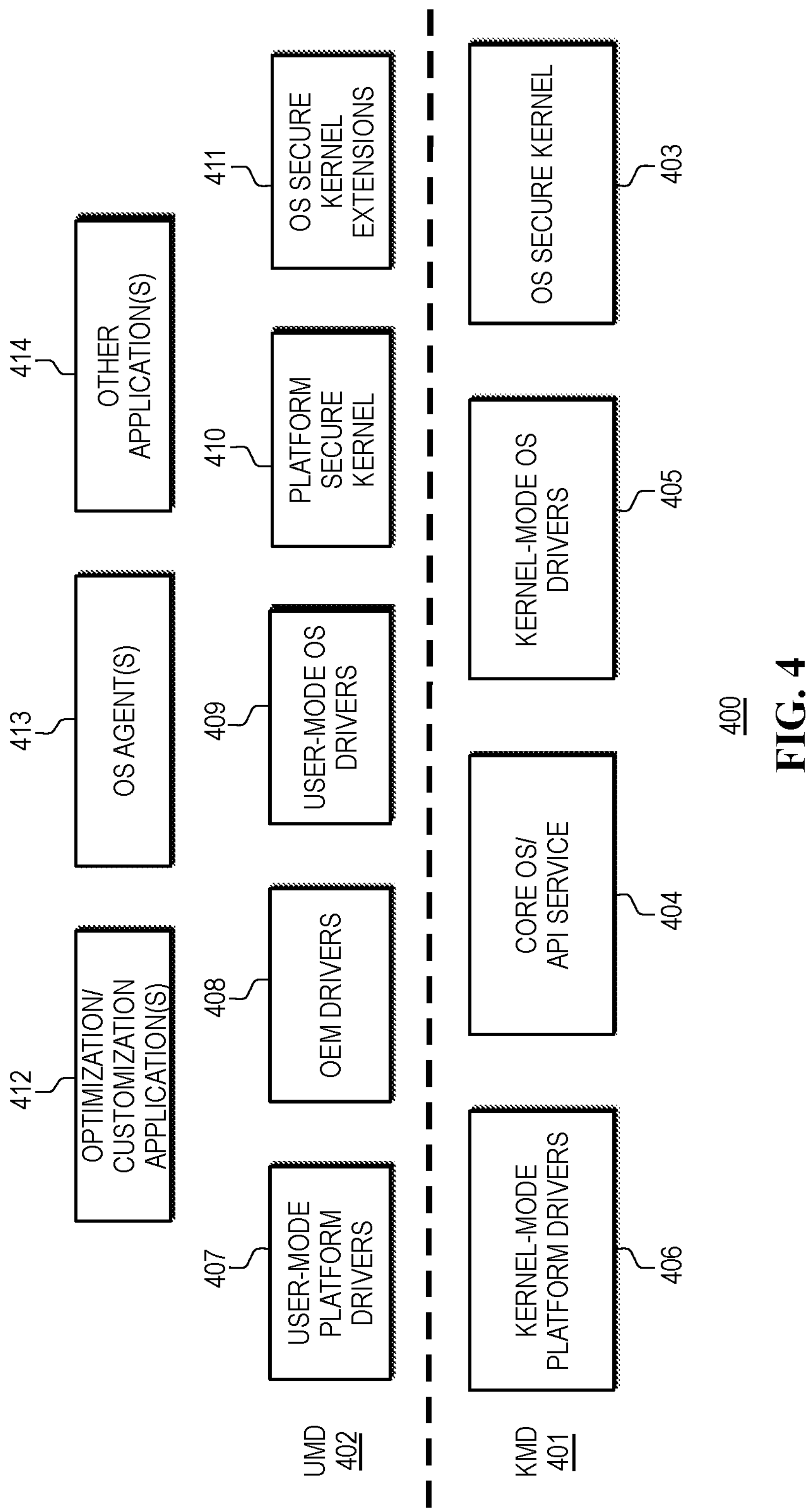
FIG. 4 is a diagram illustrating an example of a host Operating System (OS) executable by a heterogenous computing platform, according to some embodiments.

FIG. 4 is a diagram illustrating an example of host OS 400 executable by CPU clusters 301A-N of heterogenous computing platform 300. In some cases, host OS 400 may be implemented as WINDOWS on ARM. As shown, the stack of host OS 400 includes kernel mode drivers (KMD) in kernel space 401 below and user mode drivers (UMD) in user space 402 above.

In kernel space 401, OS secure kernel 403 is responsible for secure operations (e.g., encryption, validation, etc.) within IHS 200. Core OS/API service 404 has direct access to processing component(s) of IHS 200 such as, for example, heterogenous computing platform 300. OS drivers 405 include kernel mode drivers developed by the OS publisher or other developer. Platform drivers 406 include kernel mode drivers developed by the manufacturer of heterogenous computing platform 300, for example, for use with devices 301-314.

In user space 402, user-mode platform drivers and services 407 enable access to features provided by devices 301-314 through kernel-mode platform drivers 406. OEM drivers 408 enable features in OEM devices coupled to IHS 200, and user-mode OS drivers and services 409 enable access to OS features through kernel mode OS drivers 405. Platform secure kernel 410 includes protected user-mode portions of host OS 400 developed by the manufacturer of heterogenous computing platform 300, and OS secure kernel extensions 411 include extensions to protected user-mode portions of host OS 400 developed by the OS publisher or other developer.

OS agent(s) 413 may include an OS agent or client configured to communicate with service(s) provided by ITDM/OEM server 102 to establish management channel 104. Moreover, other application(s) 414 may include or be a part of any workload executable by heterogenous computing platform 300. For example, other application(s) 414 may include productivity, collaboration, streaming, multimedia, or gaming applications executable by host OS 400.

Optimization/customization application(s) 412 may include any host OS 400—level application configured to intelligently optimize the performance of IHS 200 (e.g., DELL OPTIMIZER), for example, by using AI models to dynamically configure IHS 200's settings and/or to optimize the performance of other applications 414. In operation, optimization/customization application(s) 412 may improve the productivity, performance, and user experience through system usage analysis and learning. For example, optimization/customization application(s) 412 may be invoked, within host OS 400, to learn how a selected application 414 is used. Optimization/customization application(s) 412 may identify optimization opportunities, classify users, and automatically apply appropriate settings (e.g., storage, memory, and/or CPU) to improve a selected application 414's performance.

At least one of applications 412-414 may be configured to utilize one or more devices, features, or services exposed, surfaced, enumerated, or otherwise made available by user-mode drivers 407-409, for example, through a Human Interface Device (HID) interface and/or an HID report provided by host OS 400, or the like. In some cases, one or more of applications 412-414 may operate as orchestrator 501A (FIG. 6).

In various implementations, host OS 400 may be configured to receive a firmware installation package or executable file containing at least one extension driver (e.g., a setup information or "INF" text file in a driver package) from ITDM/OEM service(s) 102 via management channel 104. The installation package may be processed by a UEFI UpdateCapsule process when distributed as part of an OS update, as a system-wide and/or device-specific firmware update, and/or it may be distributed by OEM update applications such as DELL COMMAND UPDATE, integrated with remote deployment and update management tools.

Firmware components of each extension driver may be loaded, attached, or extended onto user-mode platform drivers and services 407, and may be communicated by user-mode platform drivers and services 407 to respective devices of heterogenous computing platform 300 through kernel-mode platform drivers 406 for installation, update, or execution of such firmware components in those devices.

As such, the deployment of extension drivers by host OS 400 as OEM drivers 408 provides value-added features or services to user-mode platform drivers (e.g., base drivers) 407 and/or applications 412-414. Particularly, OEM drivers 408 may expose custom services and routines provided by any one of devices 301-314 upon execution of their corresponding firmware components. In some cases, OEM driver 408 may also operate as orchestrator 501A (FIG. 6).

Figure 5:
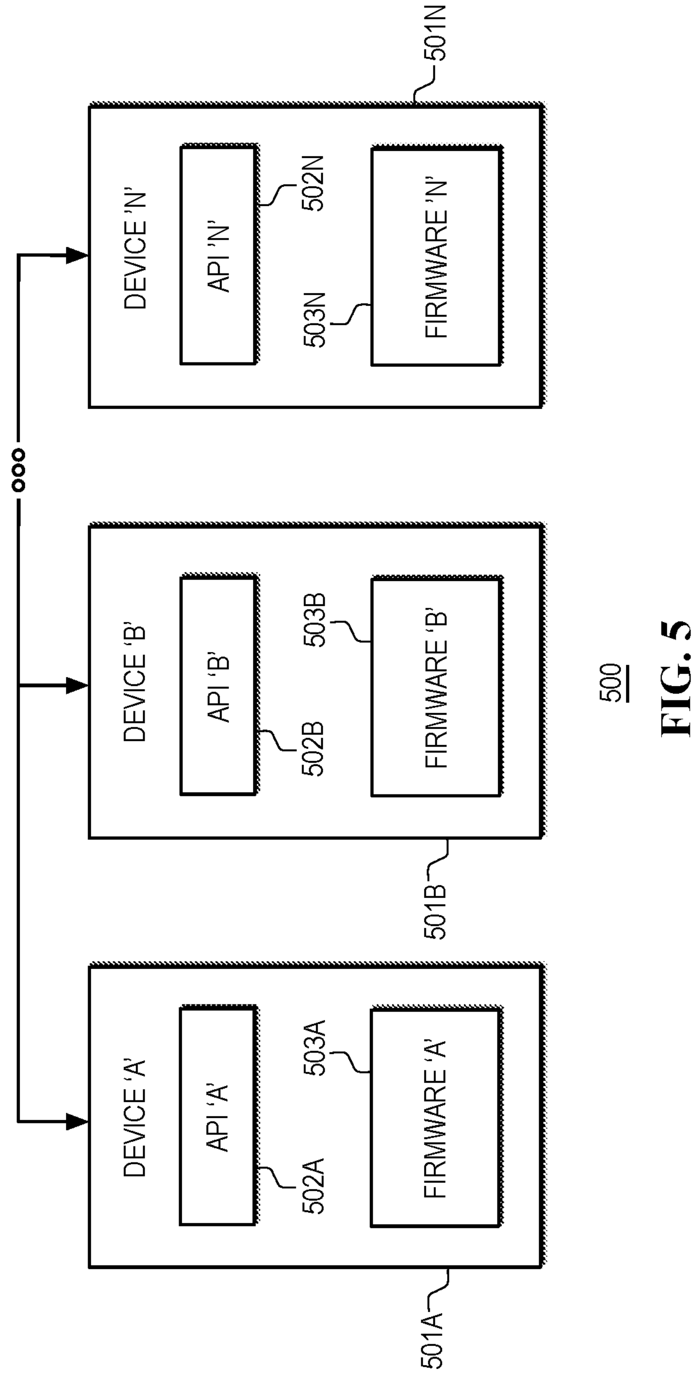
FIG. 5 is a diagram illustrating an example of host OS-independent, autonomous inter-device communications in a heterogenous computing platform, according to some embodiments.

FIG. 5 is a diagram illustrating an example of host OS-independent, autonomous inter-device communications 500 in heterogenous computing platform 300. Particularly, each of devices 501A-N may implement any of devices 301-314 of heterogenous computing platform 300.

Each of APIs 502A-N provides access to firmware 503A-N executed by a corresponding device 501A-N. In operation, each firmware component 503A-N may exchange data and commands directly with each other using APIs 502A-N. Through APIs 502A-N, one or more of devices 501A-N may be configured to enable, disable, or modify firmware services provided by other devices 503A-N. For example, in some embodiments, one or more of devices 501A-N may be designated as orchestrator 501A (FIG. 6) upon booting of platform 300.

In various embodiments, firmware services resulting from the execution of firmware 503A-N may be provided by their respective device 501A-N to other devices 501A-N within heterogeneous computing platform 300 autonomously and/or independently of the operation of host OS 400. Communications between executing firmware 503A-N and applications 412-414 may take place through OEM drivers 408. In some cases, executing firmware 503A-N may be identified by or exposed to host OS 400 and/or applications 412-414 as part of HID reports.

Firmware services 601A-N and corresponding OEM drivers 408 may be installed, modified, updated, and/or removed from IHS 200 upon each installation of a firmware installation package for the entire heterogenous computing platform 300, for example, at each boot of IHS 200. For example, each firmware component 503A-N providing a respective firmware service 601A-N may be delivered to a respective device 501A-N as an extension driver. Upon execution, firmware services 601A-N may provide additional controls over the management, deployment, customization, and/or configuration of IHS 200 to the ITDM or OEM that are independent of updates to host OS 400 and/or applications 412-414.

In other embodiments, any given one of devices 501A-N may be rebooted or reset independently of the other devices to perform a local installation, update, or modification of that given device's firmware services 601A-N without having to reboot the entire heterogenous computing platform 300 and/or IHS 200. Additionally, or alternatively, one or more of devices 501A-N may have its firmware service 601A-N at least partially installed or updated without rebooting or resetting the device.

FIG. 6 is a diagram illustrating an example of orchestration system 600 where orchestrator 501A (e.g., any of devices 301-314 assigned to operate as such) is configured to manage other devices 501B-N (e.g., other devices 301-314) of heterogenous computing platform 300 of IHS 200. In some embodiments, orchestrator 501A may be implemented as one of applications 412-414, one of OEM drivers 408, sensor hub and low-power AI device 307 and/or its firmware service(s), EC/BMC 209 and/or its firmware service(s), or any combination thereof.

Orchestrator 501A may be configured to provide firmware service(s) 601A through the execution of firmware 503A. Similarly, each of devices 501B-N may be configured to provide their own firmware service(s) 601B-N through the execution of firmware 503B-N. Moreover, each of firmware services 601A-N may operate independently of host OS 400.

Firmware service(s) 601A of orchestrator 501A may be configured to facilitate the communication of data, commands, AI models, scripts, and/or routines among firmware services 601B-N of devices 601B-N via APIs 502B-N. Additionally, or alternatively, firmware services 601B-N may exchange data and commands with each other using APIs 502B-N.

For example, in some cases orchestrator 501A may be implemented by sensor hub and low-power AI device 307 and/or by EC/BMC 209. GPU 304 may execute firmware service 601B, high-performance AI device 308 may execute firmware service 601C, aDSP 306 may execute firmware service 601D, display 309 may execute firmware service 601E, and other devices 501F-N (e.g., modem 313, peripherals 314, etc.) may execute respective ones of firmware services 601F-N. Firmware services 601A-N may be performed through the execution of firmware components 503A-N previously distributed as extension drivers in a heterogenous computing platform 300—wide firmware installation package.

Orchestrator 501A may be configured to operate a plurality of devices 501B-N and to receive context/telemetry data therefrom. In this manner, orchestrator 501A may be configured to enable IHS users, ITDMs, and/or OEMs to manage, deploy, customize, and/or configure IHS 200 and/or applications 412-414, for example, based upon contextual or telemetry-based rules.

In various embodiments, systems and methods described herein may enable an ITDM or OEM to manage, deploy, customize, and/or configure aspects of IHS 200 through orchestrator 501A. For example, ITDM/OEM service(s) 102 may provide one or more devices 501A-N of heterogeneous computing platform 300 with firmware components 503A-N that, upon execution by their respective devices, add, remove, or modify services accessible to one or more application(s) 412-414 based upon context/telemetry data.

Particularly, orchestrator 501A may receive message(s), file(s), command(s), script(s), and/or ITDM/OEM management polic(ies) 602 (e.g., an Extensible Markup Language or "XML", a JavaScript Object Notation or "JSON" file, etc.) from ITDM/OEM service(s) 102 via OS agent(s) 413 (i.e., in-band). (When management channel 104 is an 00B channel between EC/BMC 209 and ITDM/OEM service(s) 102, OS agent(s) 413 may be replaced with EC/BMC 209.)

In some cases, along with polic(ies) 602, OS agent(s) 413 may also receive one or more AI models and/or AI model parameters for use by a device within platform 300, such as high-performance AI device 308 and/or sensor hub and low-power AI device 307. AI models and/or parameters may be provided to OS agent(s) 413 by ITDM/OEM service(s) 102 or by third-party service(s) 105.

Polic(ies) 602 may contain commands, program instructions, routines, and/or rules that conform to APIs 502A-N. Alternatively, or alternatively, orchestrator 501A may interpret polic(ies) 602 and issue commands conforming to APIs 502A-N. Using APIs 502B-N, orchestrator 501A may be configured to enable, disable, or modify firmware services 601B-N based upon instructions conveyed in polic(ies) 602 (e.g., in response to changes in context, telemetry, etc.) without the involvement of host OS 400.

For example, based upon polic(ies) 602, orchestrator 501A may install, update, modify, enable or disable any of firmware services 601A-N in each of devices 501A-N in response to the detection of one or more of: an IHS location, an IHS posture (e.g., lid closed, etc.), an IHS identification (e.g., service tag, serial number, etc.), a type of IHS (e.g., manufacturer, model, etc.), an identification or type of heterogenous computing platform 300, an IHS battery (dis) charge level or rate, an identity or type of connected or available IHS peripherals, a security posture of IHS 200 (e.g., connected to VPN, disposed in a trusted or secure location, etc.), an identity or type of applications 412-414 executed by host OS 400, an identity or type of one of applications 412-414 requesting firmware services 601A-N (e.g., via OEM driver 408), an identification of a user of the IHS, an identification of a user group or role, a user's proximity to the IHS, a user's level of user engagement, detected onlooker(s), a user's personal information (e.g., languages spoken, video or audio preferences, etc.), calendar events or data (e.g., type, time, and duration of a collaboration session, priority or importance of the session, role of the user in the session, recurring status, identities and roles of other participants in the session, etc.), messaging (e.g., email, text messages, etc.) data (e.g., subject, date sent and received, number of related messages, priority, names and roles of addressees, etc.), environmental conditions (e.g., weather, background noise levels, lighting level or quality, etc.), etc.

In some cases, polic(ies) 602 may specify that orchestrator 501A select one or more of a plurality of different AI models (or different instances of the same AI model) to be used for a given operation in response to the IHS being at a certain geographic location, network location, type of audio environment, etc. Any of the contextual and/or telemetry information described herein may be used to create different sets of conditions for rules outlined in polic(ies) 602.

For example, polic(ies) 602 may specify that high-performance AI device 308 be used to apply a more computationally costly AI model (or a larger number of models) under a favorable set of conditions (e.g., if battery level is above a first threshold level, if IHS 200 is connected to AC power, if a certain application or type of application is in execution, if a level of utilization of high-performance AI device 308 and/or sensor hub and low-power AI device 307 is below a threshold level, etc.). Under a set of less favorable conditions (e.g., if battery level is below a second threshold level, if a certain application or type of application is not in execution, if a level of utilization of high-performance AI device 308 is above a threshold level, etc.), however, polic(ies) 602 may specify that sensor hub and low-power AI device 307 be used to apply a less computationally costly AI model (or fewer models).

In some cases, polic(ies) 602 may also determine whether or under what conditions the user many manually override its rules and settings (e.g., turn a camera or microphone on or off, enable or disable a filter or effect, etc.). Moreover, for different types of users (e.g., engineer, customer support, executive, etc.) who tend to interact with their IHSs 101A-N in different ways, ITDM/OEM service(s) 102 may deploy different rules, AI models, and/or parameters by selecting and deploying different polic(ies) 602.

Figure 7:
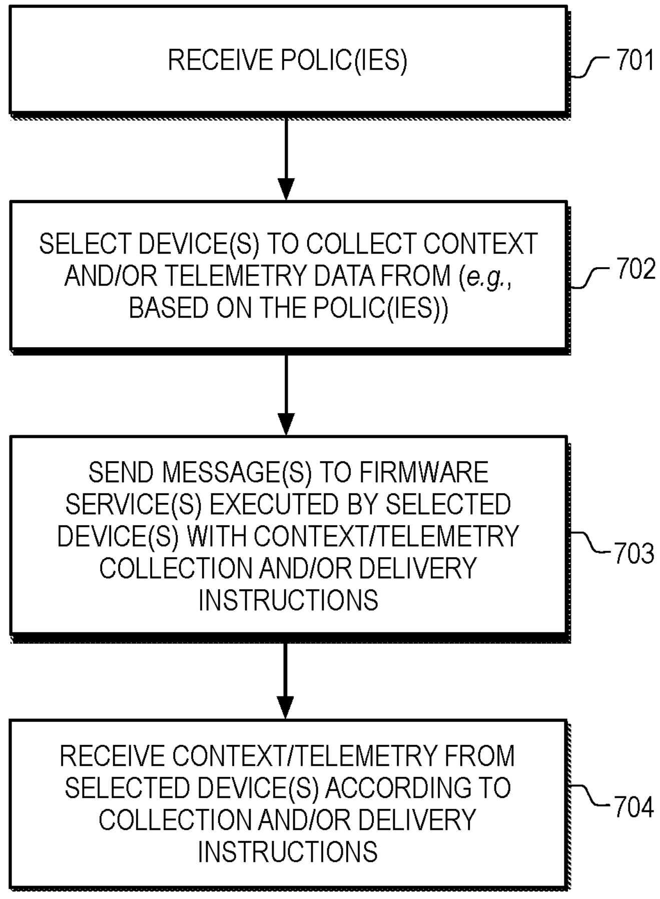
FIG. 7 is a flowchart illustrating an example of a method for collection and management of context and telemetry data in a heterogenous computing platform, according to some embodiments.

In many scenarios, systems and methods described herein may enable the collection and management of context/telemetry data from one or more of devices 501A-N, host OS 400, and/or applications 412-414. In that regard, FIG. 7 shows a flowchart illustrating an example of method 700 for the collection and management of context/telemetry data in heterogenous computing platform 300. In various embodiments, method 700 may be performed, at least in part, by firmware service 601A of orchestrator 501A.

At 701, orchestrator 501A may receive polic(ies) 602. Polic(ies) 602 may be selected by ITDM/OEM service 102 (e.g., based upon the identities of IHSs 101A-N, service tags, network addresses, user IDs, etc.) and may include rules and/or parameters usable by orchestrator 501A to manage context/telemetry data collection operations autonomously and/or independently of host OS 400. For example, polic(ies) 602 may identify one or more of: context/telemetry data to be collected, devices to collect the context/telemetry data from, context/telemetry data collection parameters (e.g., collection frequency or sampling rate, collection start and end times, a duration of the collection, a maximum amount of telemetry data to be collected, etc.), context/telemetry data collection routines, scripts, and algorithms to process and/or produce the context/telemetry data, etc. In some cases, each individual piece or set of context/telemetry data may include a common clock time stamp (e.g., if requested by polic(ies) 602).

At 702, orchestrator 501A may select one or more devices (e.g., among devices 301-314 of heterogeneous computing platform 300) to collect context/telemetry data from, based upon polic(ies) 602. In some cases, selected devices may be dynamically chosen by orchestrator 501A based upon previously collected context/telemetry data, as also outlined in polic(ies) 602.

At 703, firmware service(s) 601A of orchestrator 501A may send message(s) to one or more of firmware services 601B-N of selected devices 501A-B with instructions about how to collect any identified context/telemetry data and/or how to deliver the collected context/telemetry data. For example, such message(s) may inform a given context/telemetry collection device which other device(s) to deliver the collected data to, acceptable data format(s) or protocol(s), the manner and/or frequency of data delivery, etc. Moreover, these message(s) may be transmitted between firmware services(s) 601A-N without any involvement by host OS 400.

Firmware service(s) 601A may transmit context/telemetry collection messages to any given one of firmware service(s) 601B-N executed by devices 501B-N using a respective one of APIs 502A-N. Conversely, firmware service(s) 601B-N of devices 501B-N may send messages (e.g., acknowledgement, device status, context/telemetry data collected, etc.) to firmware service(s) 601A orchestrator 501A using API 502A, again without any involvement by host OS 400. Then, at 704, firmware service(s) 601A of orchestrator 501A receives context/telemetry data from the selected devices 501B-N following API 502A.

In various implementations, the collected context/telemetry data may be used by orchestrator 501A to enforce a wide variety of management decisions based upon polic(ies) 602. Additionally, or alternatively, the collected context/telemetry data may be input into AI model(s) executed by device(s) 501A-N.

In some cases, method 700 may be performed at the request of applications 412-414. By maintaining all context/telemetry collection routines in firmware 503A-N, method 700 addresses concerns associated with the excessive consumption of IHS resources by OS-level telemetry collection software. When, orchestrator 501A serves as the only point of contact for all context/telemetry requests targeting devices 501A-N, it may output a stream of context/telemetry data to host OS 400.

In execution, applications 412-414 (and/or host OS 400 components) may use AI models for various reasons, ranging from video/audio processing to system optimization tasks. Additionally, or alternatively, ITDMs/OEMs may use AI models to execute specific IHS management or orchestration operations.

Figure 8:
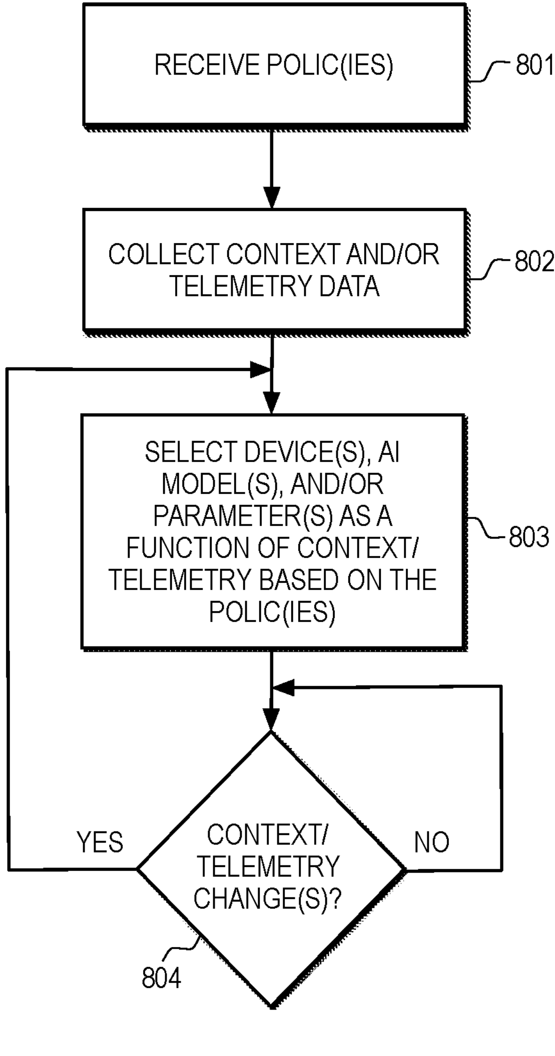
FIG. 8 is a flowchart illustrating an example of a method for deploying an Artificial Intelligence (AI) model in a heterogenous computing platform based, at least in part, upon ITDM/OEM management polic(ies), according to some embodiments.

FIG. 8 is a flowchart illustrating an example of method 800 for deploying AI models in heterogenous computing platform 300 based, at least in part, upon ITDM/OEM management polic(ies) 602. In various embodiments, method 800 may be performed, at least in part, by firmware service 601A of orchestrator 501A.

At 801, orchestrator 501A may receive polic(ies) 602 selected by ITDM/OEM service 102 (e.g., based upon the identities of IHSs 101A-N). At 802, orchestrator 501A may initiate and/or manage context/telemetry data collection operations autonomously and/or independently of host OS 400, as shown in method 700 (FIG. 7).

At 803, orchestrator 501A uses at least a subset of context/telemetry information—and/or it uses AI mode inferences produced based upon the subset of context/telemetry information—to enforce the execution of AI models following rules indicated ITDM/OEM polic(ies) 602. In that regard, it should be noted that an ITDM/OEM may set use polic(ies) 602 to enforce unique rules, triggers, and/or thresholds for selecting AI processing settings for different ones of IHSs 101A-N (or groups of IHSs) with different levels of granularity, based on context/telemetry data.

For example, at 803, orchestrator 501A may enforce a policy rule which dictates that a particular device within heterogeneous computing platform 300 be selected to execute a specific AI model (or type of AI model) with certain parameter(s) in response to different context/telemetry data, such as, for example: when an IHS is on battery power (or when the battery charge drops below or rises above a minimum value), when the IHS 200 is in a certain location (e.g., at work, at home, within a distance from selected coordinates, etc.), based on hardware utilization (e.g., a level of utilization of one or more of the devices in platform 300 reaches a maximum or minimum value), if the user of IHS 200 belongs to a selected group of users (e.g., "managers," "engineers," etc.), when IHS 200 is manipulated into a given posture, when the user is present or within a selected distance from IHS 200, etc.

At 804, orchestrator 501A may determine if there are any context/telemetry data changes (e.g., if the latest data has a value different than a previously collected data value by an amount greater than or equal to a threshold value). If not, control stays with 804. If so, control returns to 803, where orchestrator 501A may select different device(s), AI model (s), and/or parameter(s) to initiate new AI processes or give continuance to ongoing AI processes (e.g., AI model migration).

As such, method 800 provides a mechanism for orchestrator 501A to dynamically modify the provisioning of AI services by heterogeneous computing platform 300 autonomously and/or independently of host OS 400.

In various embodiments, systems and methods described herein may provide workload or usage detection and notification. As used herein, the term "workload" may broadly refer to any program or application executed by IHS 200 (e.g., by host processor(s) 201). Generally, workloads can range from simple applications (e.g., an alarm clock) to highly complex applications that use a plurality of AI models concurrently (e.g., a single application 414 may require execution of a video background segmentation model, a video background blur model, a noise cancelation model, a speech-to-text model, a gesture recognition model, etc.).

Additionally, or alternatively, the term "workload" may refer to the amount of work, load, or usage that software imposes on the underlying computing resources (e.g., the amount of time and computing resources required to perform a specific task or produce an output). For example, a light workload may accomplish its intended tasks or performance goals using relatively little resources, such as processors, CPU clock cycles, storage I/O, memory, power, and so on. Conversely, a heavy workload demands significant amounts of resources.

In various implementations, workloads may include any selected classification of one or more applications, processes, or threads. For example, workload classifications may include, but are not limited to: by application type (e.g., productivity, gaming, collaboration, streaming, etc.), by intensity or magnitude of consumption or usage of hardware resources (e.g., static, dynamic, real-time, etc.), by intensity or magnitude of consumption or usage of electrical power (e.g., light, average, heavy, etc.), by type of workload distribution over time (e.g., sustained workload vs. bursty workload), or by any other selected criteria (e.g., single display workload vs. a multi-display workload, etc.). Furthermore, an IHS may routinely execute two or more different types of workloads concurrently (e.g., 60% productivity and 40% streaming).

Consider a scenario where a user of IHS 200 is using it to play a networked video game. Ordinarily, the user must configure IHS 200 to optimize his network bandwidth and priority manually. Now consider another scenario where the user's display is set to a low resolution, but the user may not realize that such an increase in performance is possible. Even if the user could execute optimization services for automatically configuring IHS 200 (e.g., DELL OPTIMIZER), such services would typically require additional OS agents and critical communication updates to be propagated from heterogeneous computing platform 300 to host OS 400. Moreover, these additional OS agents would be charged with detecting the type of usage of IHS 200 and to modify certain IHS settings accordingly.

In contrast, systems and methods described herein may include a set of firmware services 601A-N that provides input data to host OS and other firmware-level services, thereby influencing AI model execution performance and changing various IHS settings much more efficiently. For example, a software service set may be designed to identify and classify IHS workloads and/or usage, and to provide feedback to orchestrator 501A to dynamically configure IHS settings and/or to notify OS applications and/or the user of IHS 200 of any alerts.

In some implementations, firmware service(s) 601A may be executed by sensor hub and low-power AI device 307 and/or EC/BMC 209, which may be responsible for managing the enforcement of polic(ies) 602 and collecting context/telemetry data from firmware service(s) 602A-N of devices 501A-N. Firmware service(s) 601A may route context/telemetry data received into one or more workload characterization model(s) selected to be run onto high-performance AI device 308 (e.g., GPU 304, VPU 311, etc.) to perform inferences regarding the usage, workloads, or types of workloads being handled by IHS 200. In addition, firmware service(s) 601A may configure firmware service(s) 602B-N to modify selected settings and/or to notify host OS 400 (e.g., via HID command structures, etc.) of the modifications.

Workload characterization model(s) may be provisioned and deployed with firmware service(s) 601A and executed by high-performance AI device 308. The output(s) of these workload characterization model(s) may include the detection and determination of system state, usage, and/or workloads (and their intensities), and delivered to firmware service(s) 601A.

Other firmware service(s) 601B-N (e.g., aDSP 306, display 309, camera 310, etc.) may receive configuration commands from firmware service(s) 601A to modify IHS settings based upon outputs from the workload characterization model(s), for example, as prescribed by polic(ies) 602. In some cases, host OS 400 may include its own service configured to provide certain configuration modifications (e.g., outside of driver configuration load/mechanisms) and manage and interface with HID input to alert a user of selected operations, and to direct management interfaces to remote services.

Figure 9:
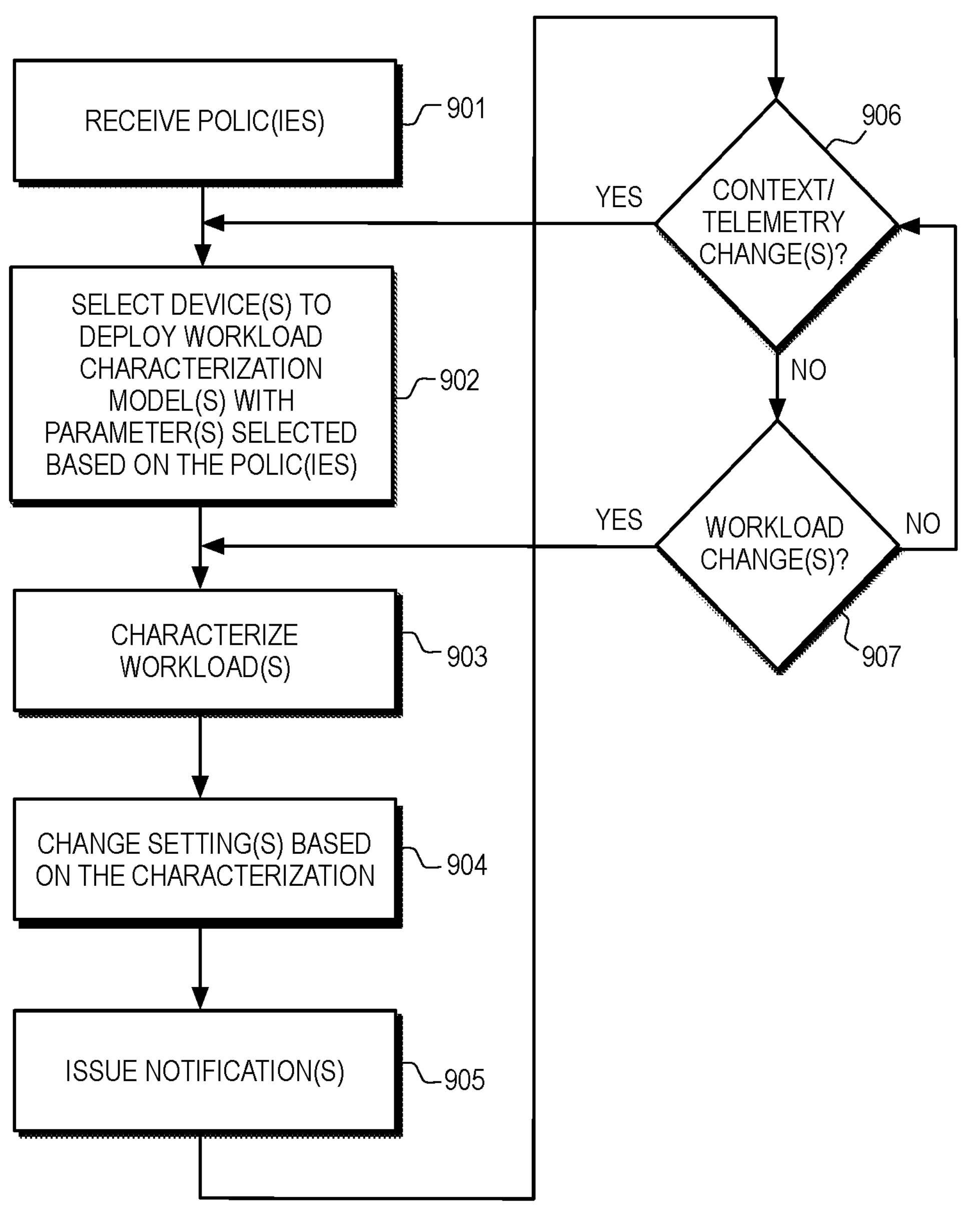
FIG. 9 is a flowchart illustrating an example of a method for usage or workload detection and notification in a heterogenous computing platform, according to some embodiments.

In that regard, FIG. 9 is a flowchart illustrating an example of method 900 for usage or workload detection and notification in heterogenous computing platform 300. In some embodiments, method 900 may be performed, at least in part, through the execution of firmware instructions by devices within heterogeneous computing platform 300 (FIG. 3) of IHS 200 (FIG. 2) implementing one of IHSs 101A-N (FIG. 1).

At 901, firmware service(s) 601A executed by orchestrator 501A receives polic(ies) 602 selected by ITDM/OEM service 102 (e.g., based upon the identities of IHSs 101A-N). At 902, orchestrator 501A may select one or more of devices 501A-N to deploy usage or workload characterization model(s) with parameter(s) selected based upon instructions or rules included in polic(ies) 602. For example, a workload characterization model may be trained to receive context/telemetry data as inputs and to identify one or more workloads (or types of workloads) in execution.

In some cases, block 902 may also include collecting context/telemetry data, for example, as described in method 700 (FIG. 7), and selecting the one or more device(s), model(s), and/or parameter(s) based upon the context/telemetry data as applied to polic(ies) 602. In some cases, the context or telemetry data may include a metric indicative of at least one of: a core utilization, a memory utilization, a network utilization, a battery utilization, a peripheral device utilization, a user's presence, a user's engagement, an IHS location, an IHS posture, an application in execution by the IHS (e.g., an application in a Graphical User Interface or "GUI" foreground, a "front-of-screen" application, etc.).

Block 902 may further include deploying workload characterization model(s) in selected device(s). For instance, orchestrator 501A may send message(s) to firmware service(s) provided by selected device(s) (e.g., high-performance AI device 308), without any involvement by host OS 400 to load and execute the workload characterization model(s).

In some implementations, polic(ies) 602 may identify at least one of: the context or telemetry data to be collected, the subset of the plurality of devices from which to collect the context/telemetry data, the one or more selected devices for executing one or more selected AI models, or an identification of the one or more AI models. Polic(ies) 602 may also include one or more rules that associate at least one of: (a) the one or more selected devices, or (b) the one or more AI models with predetermined context or telemetry data. In such implementations, orchestrator 501A may be configured to enforce rules, at least in part, based upon a comparison between current context/telemetry and the predetermined context/telemetry data.

At 903, the selected device(s) may characterize one or more workload(s) of IHS 200 using the workload characterization model(s). In some cases, a workload characterization model may identify patterns of utilization (e.g., core, memory, battery, network, peripherals, etc.) by certain devices 501A-N that are indicative of an ongoing collaboration session, a video game session, a productivity session (e.g., document processor, spreadsheets, presentations, email client, etc.), etc.

Additionally, or alternatively, a workload characterization model may identify patterns of utilization of different types of workloads (e.g., productivity, collaboration, browsing, streaming, video games, etc.) and/or their intensity. In some cases, such workload characterization results may indicate that X % of available IHS resources are executing a first type of workload and Y % of those resources are executing a second type of workload, concurrently. The selected device(s) may then send an indication of workload characterization results to orchestrator 501A without any involvement by host OS 400.

At 904, orchestrator 501A may change one or more IHS settings based, at least in part, upon the characterization results, as instructed by polic(ies) 602. For instance, polic(ies) 602 may include rules that indicate, for each characterized workload, what one or more settings should be. Additionally, or alternatively, polic(ies) 602 may require orchestrator 501A to execute another type of AI model that receives characterization results and/or other context/telemetry data as inputs, and that infers the appropriate settings for a given workload.

Examples of IHS settings may include, for at least one of the plurality of devices 501A-N, at least one of: a power state, a maximum power consumption, a clock speed, a turbo frequency, a multithreading feature, the availability of an accelerator, or a memory allocation. Additionally, or alternatively, IHS settings may include at least one of: a display's brightness, a display's resolution, a display's color depth, a display's refresh rate, a microphone's gain, or a speaker's volume, a camera's capture resolution, or a camera's refresh rate. Additionally, or alternatively, IHS settings may include, for at least one of the characterized one or more workloads, at least one of: a network bandwidth, or a connection priority.

At 905, orchestrator 501A may notify at least one of: host OS 400, any of applications 412-414, or a user of IHS 200 about the characterization of the one or more workloads and/or the settings referred to in 904.

At 906, orchestrator 501A may determine if the context/telemetry data has changed (e.g., by an amount greater than a threshold value). If so, control returns to 902 where new device(s), AI model(s), and/or parameters may be selected and deployed based upon the application of polic(ies) 602 to the changed context/telemetry data. If not, control passes to 907.

At 907, orchestrator 501A determines if there have been changes to one or more workload(s). If not, control returns to 906. If so, control passes to 903, where the new or changed workloads may be (re)characterized.

As such, systems and methods described herein may provide scalable, inter-device communication paths for data communications and control operations with reduced reliance on host OS 400 for runtime communication and optimized execution. These systems and methods may also provide distribution mechanisms for device-to-device firmware provisioning across devices 501A-N from a single device 501A (e.g., for common features). As such, these systems and methods may enable performance-optimized context and telemetry collection, as well as workload inference determinations without OS configuration paths, thus leading to improved performance and faster response times.

In some situations, a user of IHS 200 may execute applications 412-414, along with one or more AI model(s), on processor(s) 201 (e.g., for performance optimization reasons). In many contexts, however, the focus on performance can consume CPU cycles and negatively impact the IHS's battery life. When certain systems and methods described herein are implemented, however, one or more AI models in execution by processor(s) 201 may instead be run on GPU 304, for example, and provide higher battery life with similar performance. Additionally, or alternatively, AI model parameter(s) may be adjusted to achieve different goals (e.g., accuracy, speed, etc.).

Non-limiting examples of AI model parameters that can be modified or influenced during runtime include a neural network's weights (w) and biases (b). Neurons are basic units of a neural network. In some AI models, each neuron within a neural network's layer is connected to some (or all) of the neurons in the next layer. When signals are transmitted between neurons, weights are applied to the inputs along with the bias.

A "weight" is a type of model parameter that controls a signal (or the strength of the connection) between two neurons (e.g., it determines how much influence the input will have on the output). Conversely, a "bias" is another type of model parameter that provides an additional input into the next layer with a constant value, which is not influenced by the previous layer, but rather has an outgoing connection (with its own weight). In some cases, a bias value of '1' may guarantee that, in a neural network, even when all the inputs are zeros, a particular neuron is activated; whereas a bias value of '0' deactivates that neuron. Adjusting weights or biases may change the structure of the neural network, which in turn modifies an AI model's performance, power consumption, inference accuracy, and/or speed of execution.

In some implementations, firmware service(s) 601A may be executed by sensor hub and low-power AI device 307 and/or EC/BMC 209, which may be responsible for managing the enforcement of polic(ies) 602 and collecting context/telemetry data from firmware service(s) 602A-N of devices 501A-N. Firmware service(s) 601A may evaluate context/telemetry data against one or more rules set in polic(ies) 602 to select corresponding modifications to a selected one or more of an AI model's parameters during execution of the AI model and/or to initiate the migration of an AI model from a first one to a second one of devices 501A-B. In addition, firmware service(s) 601A may configure firmware service(s) 602B-N to modify selected settings and/or to notify host OS 400 (e.g., via HID command structures, etc.) of the modifications.

Other firmware service(s) 601B-N (e.g., GPU 304, high-performance AI device 308, VPU 311, etc.) may receive commands from firmware service(s) 601A to modify an AI model's parameters during its execution, for example, as prescribed by polic(ies) 602.

In some implementations, OS agent 413 may receive polic(ies) 602 from ITDM/OEM service 102, and it may deliver them (or at least a portion of their contents/logic) to orchestrator 501A, for example, using user-model platform drivers 407. Additionally, OS agent 413 may deliver notifications to host OS 400.

Firmware service 601A may run in sensor hub and low-power AI device 307 or EC/BMC 209, and it may collect selected context/telemetry data from other firmware service(s) 601B-N in any manner identified in polic(ies) 602. Using the collected context/telemetry data, firmware service 601A may determine, based on rules prescribed by polic(ies) 602, which AI model currently in execution to modify (e.g., modify the n most power consuming AI models currently in execution, modify any AI model currently executed by processor(s) 201, modify any AI model with a device utilization above a threshold value, modify any AI model associated with audio operations, modify any AI model associated with video workloads, etc.), and which model parameters to modify in each executing AI model (e.g., weights, biases, etc.). Firmware service 601A may also evaluate runtime AI logic functions to identify an AI model's desired execution environment (e.g., CPU 201 vs. GPU 304), and provide changes to AI model locations or otherwise trigger an AI model's migration to another device.

Figure 10:
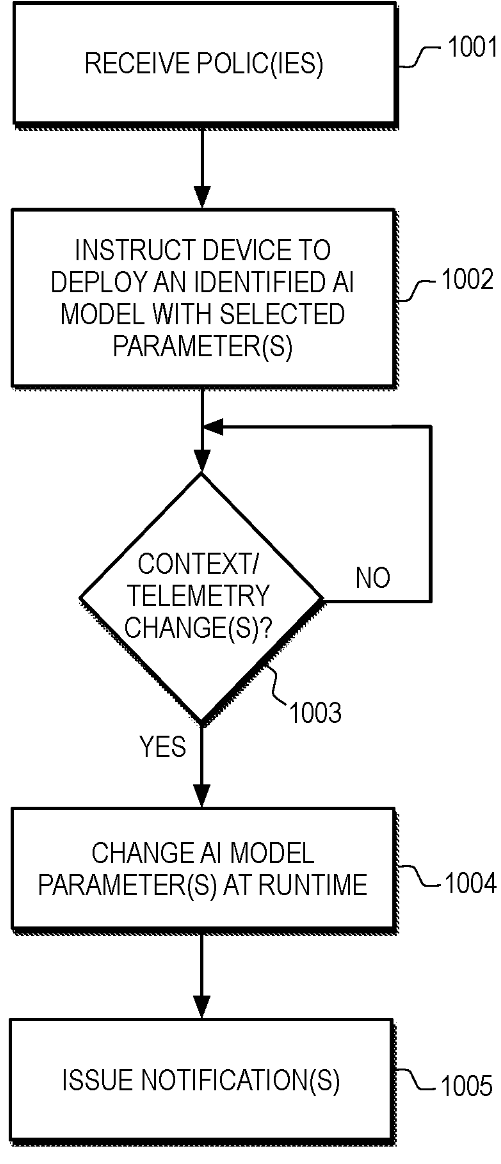
FIG. 10 is a flowchart illustrating an example of a method for runtime control of AI model parameters in a heterogenous computing platform, according to some embodiments.

FIG. 10 is a flowchart illustrating an example of method 1000 for runtime control of AI model parameters in heterogenous computing platform 300. In some embodiments, method 1000 may be performed, at least in part, through the execution of firmware instructions by devices within heterogeneous computing platform 300 (FIG. 3) of IHS 200 (FIG. 2) implementing one of IHSs 101A-N (FIG. 1).

At 1001, firmware service(s) 601A executed by orchestrator 501A receives polic(ies) 602 selected by ITDM/OEM service 102 (e.g., based upon the identities of IHSs 101A-N). At 1002, orchestrator 501A may instruct a device (e.g., any of devices 501B-N) to deploy an AI model with parameter(s) selected based upon instructions or rules included in polic(ies) 602. The AI model specified in polic(ies) 602 may be any AI model, including, for example, a workload characterization model described in method 900 (FIG. 9).

In some cases, at 1002 method 1000 may also include collecting context/telemetry data, for example, as described in method 700 (FIG. 7). The context/telemetry data may include a metric indicative of at least one of: a core utilization, a memory utilization, a network utilization, a battery utilization, a peripheral device utilization, a user's presence, a user's engagement, an IHS location, an IHS posture, an application in execution by the IHS (e.g., an application in a Graphical User Interface or "GUI" foreground, a "front-of-screen" application, etc.).

At 1002, method 1000 may further include deploying the AI model in the identified device. For instance, orchestrator 501A may send message(s) to firmware service(s) provided by the identified device (e.g., high-performance AI device 308) without any involvement by host OS 400 to load and execute the AI model.

In some implementations, polic(ies) 602 may identify at least one of: the context or telemetry data to be collected, the subset of the plurality of devices from which to collect the context/telemetry data, a device for executing a selected AI model, an identification of the AI models, or one or more model parameter values.

Polic(ies) 602 may also include one or more rules that associate at least one of: (a) the parameter, or (b) a modification of the parameter with predetermined context or telemetry data, such that orchestrator 501A may be configured to enforce these rules based, at least in part, upon a comparison between current context or telemetry data and the predetermined context or telemetry data. In such implementations, orchestrator 501A may be configured to select at least one of: (a) another parameter, or (b) another modification of the other parameter based, at least in part, upon a change in the current context or telemetry data.

At 1003, orchestrator 501A may determine if the context/telemetry data has changed (e.g., by an amount greater than a threshold value). If not, control stays with 1003.

If so, at 1004, orchestrator 501A may modify AI model parameters for any executing model at runtime according to polic(ies) 602. To modify an AI model parameter, orchestrator 501A may instruct a device among the plurality of devices to modify the parameter of an Artificial Intelligence (AI) model, for example, by sending a message to one or more firmware services provided the device via an API (e.g., 502B-N) without any involvement by host OS 400.

Finally, at 1005, orchestrator 501A may notify at least one of: host OS 400, any of applications 412-414, or a user of IHS 200, about any model parameter modifications.

As such, systems and methods described herein may implement firmware management techniques configured to scale, deliver, and initiate hardware-optimized, AI model parameter influences, such as to the AI model's weights and biases, for example, using an ITDM/OEM-managed orchestrator in a heterogenous computing platform.

In some scenarios, a user may execute application(s) 412-414 with multiple deep learning (DL)-type AI models integrated therein (e.g., a collaboration session with several DL models running concurrently on audio and video data, etc.). In each DL-type AI model, a plurality of layers of processing may be used to extract progressively higher-level features from data. Accordingly, when multiple DL-type AI models are running, IHS 200 may suffer from poor performance (e.g., high latency, etc.) due to the high utilization of host processor(s) 201. If the user restarts application(s) 412-414 or reboots IHS 200, the problem is likely to persist, thus leading to undesirable customer experiences.

Using systems and methods described herein, however, AI models having certain types of architectures may be better accelerated on selected devices within heterogeneous computing platform 300. For example, in some cases, Convolutional Neural Network (CNN) models may be assigned or offloaded to GPU 304 or VPU 311, whereas sequence-based models such as Recurrent Neural Networks (RNNs) and Long Short-Term Memory networks (LSTMs) may be assigned or offloaded to processor(s) 201 or high-performance AI device 308.

For example, one or more applications 412-414 may consume the outputs of multiple DL-type AI models executed by host processor 201. An AI characterization model may be a pretrained model integrated into optimization/customization application 412 and configured to track processes and threads associated with applications 412-414, for example, via host OS 400 mechanisms. In some cases, the AI characterization model may be executed by processor(s) 201 or by orchestrator 501A itself.

The AI characterization model may use process and thread data to infer the type of computations occurring in applications 412-414. In some cases, the AI characterization model may be a supervised classification or characterization model with labeled instances from various types of neural network architectures.

An output of the AI characterization model may include characterization results that list a type of neural network architecture for each of the multiple DL-type AI models in execution by host processor(s) 201, such that each type of neural network may have a probability or confidence associated therewith. Examples of types of neural network architectures used by the multiple DL-type AI models include, but are not limited to: a perceptron, a feed forward neural network, a multilayer perceptron, a convolutional neural network, a radial basis function neural network, a recurrent neural network, a long short-term memory neural network, a sequence-to-sequence neural network, and a modular neural network.

Moreover, each type of neural network architecture may correspond to one or more neural network operation(s) (e.g., ConVnet: 0.8, polling: 0.1, other: 0.1), which the "AI model characterization" model may attempt to detect. Examples of such operations may include, but are not limited to: Convolution, Pooling, Fully Connected, MaxPool, ReduceMean, Gather, MVN, Concat, Power, DepthToSpace, Substract, GeLU, Add, AvgPool, Fake Quantize, Norm, Erf, TopK, Multiply, SoftMax, ScaleShift, Unsqueeze, Pad, OneHot, ReLU, ReShape, LSTMSequence, Squeeze, Clamp, Split, Group Convolution, ReverseSequence, Sigmoid, Transpose, StrideSlice, GEMM, Interpolate, Permute, PreLU, MatMul, ShapeOf, Exp, Tanh, Resample, SpaceToDepth, Squared Difference, etc.

Depending upon the characterization results obtained by the AI characterization model, a static mapping table may be used to offload an AI model's execution from host processor(s) 201 to any another device 501A-N on heterogeneous computing platform 300, for example, based on polic(ies) 602. In some cases, the user may be notified to restart applications 412-414 and/or reboot IHS 200 so that, in subsequent execution of applications 412-414, each of devices 501A-N may execute AI model(s) previously assigned to them.

Figure 11:
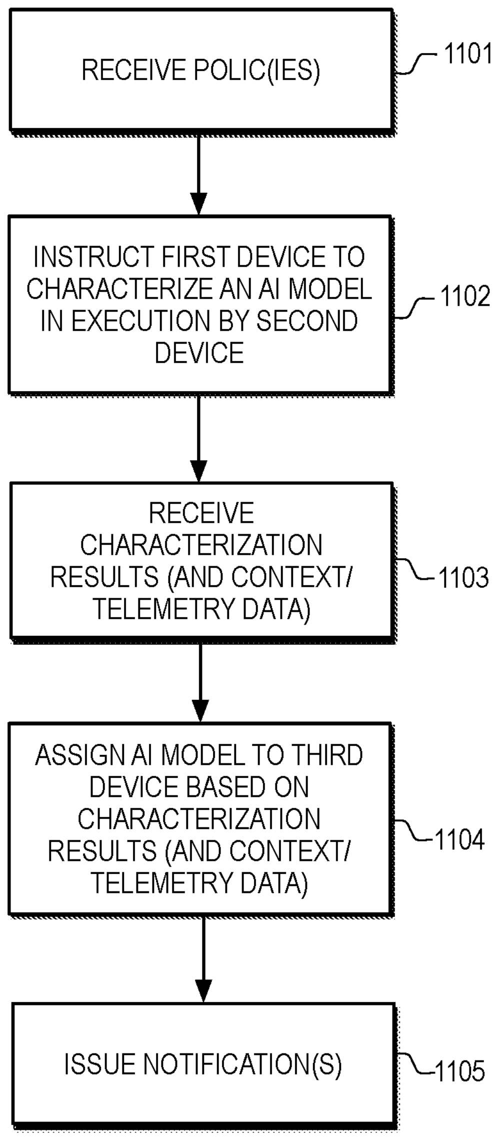
FIG. 11 is a flowchart illustrating an example of a method for offloading execution of an AI model from one device to another device in a heterogenous computing platform, according to some embodiments.

In that regard, FIG. 11 is a flowchart illustrating an example of method 1100 for offloading execution of an AI model from one device to another device in heterogenous computing platform 300. In some embodiments, method 1100 may be performed, at least in part, through the execution of firmware instructions by devices within heterogeneous computing platform 300 (FIG. 3) of IHS 200 (FIG. 2) implementing one of IHSs 101A-N (FIG. 1).

At 1101, firmware service(s) 601A executed by orchestrator 501A receives polic(ies) 602 selected by ITDM/OEM service 102 (e.g., based upon the identities of IHSs 101A-N). At 1102, orchestrator 501A may select a first device (e.g., high-performance AI device 308) among any of devices 501A-N to deploy an AI characterization model configured to characterize other AI model(s) in execution by a second device (e.g., host processor(s) 201 or any other device 501A-N) at the behest of applications 412-414, for example, based upon instructions or rules included in polic(ies) 602.

In various implementations, an AI characterization model may be trained to receive application, process, or thread data as inputs (e.g., from host OS 400), and to identify one or more neural network architectures (or types of workloads) being employed by the other AI model(s) in execution by host processor(s) 201 based on those inputs.

Block 1102 may further include deploying such AI characterization model in the first device. For instance, orchestrator 501A may send message(s) to firmware service(s) provided by the first device, without any involvement by host OS 400 to load and execute the AI characterization model.

At 1103, orchestrator 501A may receive characterization results from the first device. In some cases, block 1103 may also include receiving context/telemetry data, for example, as described in method 700 (FIG. 7). For example, context or telemetry data may include a metric indicative of at least one of: a core utilization, a memory utilization, a network utilization, a battery utilization, a peripheral device utilization, a user's presence, a user's engagement, an IHS location, an IHS posture, an application in execution by the IHS (e.g., an application in a Graphical User Interface or "GUI" foreground, a "front-of-screen" application, etc.).

In some implementations, polic(ies) 602 may identify at least one of: selected device(s), AI characterization model(s), types of neural network architecture(s) or operation(s), offloading device(s), and predetermined context/telemetry data. Polic(ies) 602 may also include one or more rules that associate different characterization results and/or context/telemetry data with one or more offloading device(s). In these implementations, orchestrator 501A may also be configured to enforce rules, at least in part, based upon a comparison between current context/telemetry and the predetermined context/telemetry data.

At 1104, orchestrator 501A may select a third, offloading device (e.g., GPU, aDSP, VPU, ISP, NPU, TSU, NNP, IPU, etc.) based upon the AI model characterization results and/or the context/telemetry data, as applied to polic(ies) 602. In some cases, upon the subsequent instantiation of applications 412-414, any characterized DL-type AI models or operations may be assigned or offloaded to any previously identified offloading devices.

At 1105, orchestrator 501A may notify at least one of: host OS 400, any of applications 412-414, or a user of IHS 200 about the offloading of one or more AI models.

As such, systems and methods described herein may use an AI characterization model to infer the types of operations and/or neural network architectures involved in the execution of other AI models on any device within heterogeneous computing platform 300; but which would otherwise remain a black box system. Based upon such inferences (as well as context/telemetry data), these systems and methods may schedule the execution of characterized AI models on optimal or most efficient AI hardware at runtime, thus improving battery runtime and reducing power consumption.

In some scenarios, a user may execute application(s) 412-414 with multiple DL-type AI models operating concurrently, which may reduce the performance of IHS 100 (e.g., latency, power consumption, battery life, etc.) along with the quality of the user's experience. As the inventors hereof have recognized, however, large DL models specifically tuned for NPUs, VPUs, CPUs may not provide the best experience in terms of latency vs. battery life when AI model concurrency is high across applications.

To address these, and other concerns, systems and methods described herein may be employed to create, train, and deploy multiple instances or versions of a same AI model, each instance having a different level of computational complexity (e.g., different degrees of quantization, levels of pruning, weight sharing, etc.), to an appropriate device within heterogeneous computing platform 300.

Instances of AI models with decreasing levels of computational complexity level may produce inferences of inferior quality (e.g., accuracy, fidelity, etc.), but result in greater IHS performance metrics—which may be calculated based upon context/telemetry data. Conversely, instances of the same AI models with increasing levels of computational complexity level may produce better inferences at the cost of worsening IHS performance metrics.

In some cases, when an AI model execution load on platform 300 (e.g., a number of concurrent AI models, a total device utilization or power consumption metric, etc.) risks negatively affecting an IHS performance and/or user experience metric (e.g., by reducing it by a threshold amount), a higher-complexity instance of an AI model in execution may be halted and replaced with a lower-complexity instance of the AI model. Depending upon one or more rules of polic(ies) 602, the lower-complexity instance of the AI model may be assigned to another device than the one previously executing the higher-complexity instance.

In a case where an AI model trained to perform semantic segmentation of background video is invoked by application(s) 412-414, for instance, orchestrator 501A may select one of a plurality of instances of such an AI model, each instance trained for the same use case on a different device (e.g., an NPU version of the AI model has better accuracy but higher latency, whereas a CPU version of the same AI model has worse accuracy but lower latency). These instances may be identified, for example, in one or more AI model instance tables contained in or referenced to in polic(ies) 602.

For example, each row of an AI model instance table in polic(ies) 602 may identify a respective type of AI model (e.g., background segmentation, virtual background, noise cancelation, Speech-to-Text, etc.). Meanwhile, each column of the table may include an identification of different AI model versions with varying levels of computation complexity such as, for example: (a) an NPU version—U-Net with 16-bit floating point (FP) format and 99% Intersection over Union (IoU) or other accuracy metric; (b) a VPU version—U-Net with 8-bit integer (INT) format and 95% IoU; and (c) a CPU version with INT 8, highly pruned, and 92% IoU. In some cases, an AI model instance table may also include, for each different instance of a same AI model, metric(s) related to absolute or relative latency of execution and/or power consumption.

In an embodiment, a software service executed by processor(s) 201) may be configured to detect a user's activity and the need for multiple concurrent AI inferences requested by different applications in execution. The software service may also track metrics such as, for example: DC user, runtime left, user presence detection, etc. Then, based at least in part upon data received from the software service, orchestrator 501A may use polic(ies) 602 to select which version of which AI model(s) to execute for each of the different applications.

Figure 12:
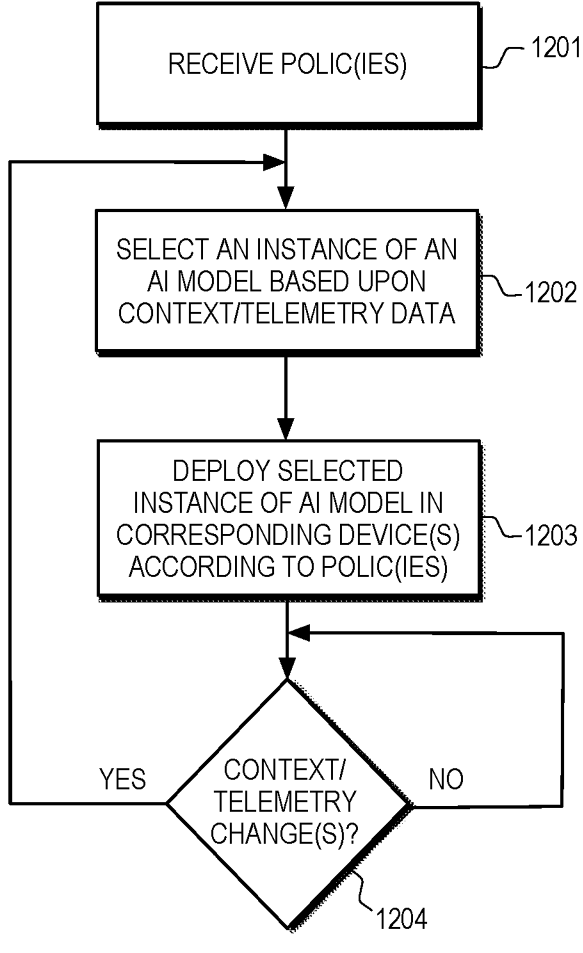
FIG. 12 is a flowchart illustrating an example of a method for deploying instances of AI models having different levels of complexity in a heterogenous computing platform, according to some embodiments.

FIG. 12 is a flowchart illustrating an example of method 1200 for deploying instances of AI models having different levels of complexity in heterogenous computing platform 300. In some embodiments, method 1200 may be performed, at least in part, through the execution of firmware instructions by devices within heterogeneous computing platform 300 (FIG. 3) of IHS 200 (FIG. 2) implementing one of IHSs 101A-N (FIG. 1).

At 1201, firmware service(s) 601A executed by orchestrator 501A may receive polic(ies) 602 selected by ITDM/OEM service 102 (e.g., based upon the identities of IHSs 101A-N). Based upon rules within polic(ies) 602, orchestrator 501A may identify context/telemetry information to collect from a subset of other devices within heterogeneous computing platform 300 and/or host OS 400. As such, at 1201, method 1200 may also include receiving context/telemetry data, for example, as described in method 700 (FIG. 7).

At 1202, orchestrator 501A may identify an AI model in execution (or to be executed) based, at least in part, upon received context/telemetry data. For example, orchestrator 501A may calculate (or request that another device calculate) an IHS performance metric using the context/telemetry data. As part of its enforcement of polic(ies) 602, orchestrator 501A may determine whether a lower-complexity instance of the AI model should be selected to improve the IHS's performance metric (e.g., to promote longer battery life—if user is in DC mode—at the expense of greater latency) or whether a higher-complexity instance of the AI model should be selected to improve the user's experience (e.g., to decrease latency at the in exchange for a shorter battery life).

At 1203, orchestrator 501A may select and deploy an appropriate instance of the AI model in a corresponding one of devices 501B-N according to the AI model instance table of polic(ies) 602. At 1204, orchestrator 501A may determine whether there are context/telemetry changes (e.g., that affect the IHS performance metric). If not, control remains with 1204. Otherwise, control returns to 1202, where orchestrator 501A determines whether to select another instance of the AI model with yet another level of computational complexity in response to the context/telemetry changes.

As such, systems and methods described herein may enable the selection of appropriate versions of an AI model, each version having a different level of computational complexity, for execution on corresponding devices within heterogeneous computing platform 300 based, at least in part, upon context/telemetry data indicative of IHS resources and runtime metrics. The systems and methods may improve and/or guarantee the delivery of AI capabilities by distributing AI models of varying complexities across proper devices. Moreover, by intelligently monitoring and configuring AI model selection and deployment, these systems and methods may enforce polic(ies) 602 that account for any combination of power consumption, performance, and/or battery life considerations.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), that comprises:

- a heterogeneous computing platform that comprises a plurality of devices configured with a respective plurality of microcontrollers; and
- a memory coupled to the heterogeneous computing platform, wherein the memory comprises a plurality of sets of firmware instructions, wherein each of the sets of firmware instructions, upon execution by a microcontroller of a respective device among the plurality of devices in a memory space distinct from any IHS host processor memory space, enables the respective device to provide a respective firmware service, and wherein at least one of the plurality of devices operates as an orchestrator configured to perform operations that comprise:
  - infer a type of a first Artificial Intelligence (AI) model executed by a first device among the plurality of devices, based, at least in part, on execution of a second AI model trained to classify another AI model as one of a plurality of AI model types based upon process or thread information associated with applications configured to consume output of the other AI model, wherein the second AI model is executed by a second device among the plurality of devices, and wherein the second AI model is configured to infer the type of the first AI model; and
  - select another device among the plurality of devices to execute the first AI model based, at least in part, upon the inference as applied to an Information Technology Decision Maker (ITDM) or Original Equipment Manufacturer (OEM) policy, and offload subsequent execution of the first AI model to the other device.

2. The IHS of claim 1, wherein the heterogeneous computing platform comprises: a System-On-Chip (SoC), a Field-Programmable Gate Array (FPGA), or an Application-Specific Integrated Circuit (ASIC).

3. The IHS of claim 1, wherein the orchestrator comprises at least one of: a sensor hub, an Embedded Controller (EC), or a Baseboard Management Controller (BMC).

4. The IHS of claim 1, wherein the inferred type comprises a type of neural network or operation used in the first AI model.

5. The IHS of claim 4, wherein the type of neural network is selected from the group consisting of: a convolutional neural network, a recurrent neural network, and a long short-term memory neural network.

6. The IHS of claim 1, wherein to infer the type, the orchestrator is configured to receive a message from a firmware service executed by the first device via a firmware service to firmware service API without any involvement by any host Operating System (OS).

7. The IHS of claim 1, wherein the first device comprises the orchestrator and the second device comprises a Central Processing Unit (CPU).

8. The IHS of claim 1, wherein the first and second devices comprise a Central Processing Unit (CPU).

9. The IHS of claim 1, wherein the process or thread information is provided by a host Operating System (OS).

10. The IHS of claim 1, wherein the other device comprises a Graphical Processing Unit (GPU), an audio Digital Signal Processor (aDSP), a Video Processing Unit (VPU), an Image Signal Processor (ISP), a Neural Processing Unit (NPU), a Tensor Processing Unit (TSU), a Neural Network Processor (NNP), or an Intelligence Processing Unit (IPU).

11. The IHS of claim 1, wherein to offload the subsequent execution of the first AI model to the other device, the orchestrator is configured to send a message to a firmware service executed by the other device via a firmware service to firmware service API without any involvement by any host Operating System (OS).

12. The IHS of claim 1, wherein to offload the subsequent execution of the first AI model to the other device, the orchestrator is configured to select the other device based, at least in part, upon the inferred type.

13. The IHS of claim 1, wherein to offload the subsequent execution of the first AI model to the other device, the orchestrator is further configured to select the other device based, at least in part, upon contextual or telemetry data.

14. The IHS of claim 13, wherein the contextual or telemetry data comprises a metric indicative of at least one of: a core utilization, a memory utilization, a network utilization, a battery utilization, a peripheral device utilization, a user's presence, a user's engagement, an IHS location, an IHS posture, or an application in execution by the IHS.

15. The IHS of claim 1, wherein the orchestrator is further configured to receive a policy from an Information Technology Decision Maker (ITDM) or Original Equipment Manufacturer (OEM), and wherein the policy identifies at least one of: the first device, the first AI model, the second device, or the second AI model.

16. The IHS of claim 15, wherein the policy comprises one or more rules, and wherein each rule associates a different inferred type with one or more of the plurality of devices.

17. The IHS of claim 1, wherein the orchestrator is further configured to notify at least one of: a host Operating System (OS) executed by the heterogeneous computing platform, an application instantiated by the host OS, or a user of the IHS of the selection.

18. A memory coupled to a heterogeneous computing platform, wherein the heterogeneous computing platform comprises a plurality of devices configured with a respective plurality of microcontrollers, wherein the memory is configured to receive a plurality of sets of firmware instructions, wherein each set of firmware instructions, upon execution by a microcontroller of a respective device among the plurality of devices in a memory space distinct from any IHS host processor memory space, enables the respective device to provide a respective firmware service operable at least in part via at least one firmware service to firmware service Application Programming Interface (API) without any involvement by any host Operating System (OS), and wherein at least one of the plurality of devices operates as an orchestrator configured to perform operations that comprise:

infer a type of a first Artificial Intelligence (AI) model executed by a first device among the plurality of devices, based, at least in part, on execution of a second AI model trained to classify another AI model as one of a plurality of AI model types based upon process or thread information associated with applications configured to consume output of the other AI model, wherein the second AI model is executed by a second device among the plurality of devices, and wherein the second AI model is configured to infer the type of the first AI model; and select another device among the plurality of devices to execute the first AI model based, at least in part, upon the inference as applied to an Information Technology Decision Maker (ITDM) or Original Equipment Manufacturer (OEM) policy, and offload subsequent execution of the first AI model to the other device.

19. A method, comprising:

selecting a policy; and transmitting the policy to an Information Handling System (IHS) over a network, wherein the IHS comprises a heterogeneous computing platform having a plurality of devices configured with a respective plurality of microcontrollers each executing a respective set of firmware instructions in a memory space distinct from any IHS host processor memory space, wherein each set of firmware instructions is configured to provide a respective firmware service operable at least in part via at least one firmware service to firmware service Application Programming Interface (API), and wherein an orchestrator among the plurality of devices is configured to:

infer a type of a first Artificial Intelligence (AI) model being executed by a first device among the plurality of devices, based, at least in part, on executing a second AI model trained to classify another AI model as one of a plurality of AI model types based upon process or thread information associated with applications configured to consume output of the other AI model, wherein the second AI model is executed by a second device among the plurality of devices, and wherein the second AI model is configured to infer the type of the first AI model; and select another device among the plurality of devices to execute the first AI model based, at least in part, upon the inference as applied to an Information Technology Decision Maker (ITDM) or Original Equipment Manufacturer (OEM) policy, and offload subsequent execution of the first AI model to the other device.

* * * * *